(12) United States Patent
Smith et al.

(10) Patent No.: US 11,313,426 B2
(45) Date of Patent: Apr. 26, 2022

(54) COOLING DUCTS FOR DISC BRAKE CALIPER AND METHOD OF MANUFACTURE THEREOF

(71) Applicant: ALCON COMPONENTS LIMITED, Staffordshire (GB)

(72) Inventors: Andrew Charles Smith, Warwickshire (GB); Stephen James Hodgkins, Leicestershire (GB); Richard James Humble, Leicestershire (GB)

(73) Assignee: ALCON COMPONENTS LIMITED, Tamworth (GB)

( * ) Notice: Subject to any disclaimer, the term of this patent is extended or adjusted under 35 U.S.C. 154(b) by 0 days.

(21) Appl. No.: 16/929,596

(22) Filed: Jul. 15, 2020

(65) Prior Publication Data
US 2020/0347899 A1 Nov. 5, 2020

Related U.S. Application Data

(62) Division of application No. 15/792,072, filed on Oct. 24, 2017, now Pat. No. 10,738,851.

(30) Foreign Application Priority Data

Oct. 27, 2016 (GB) ...................................... 1618402

(51) Int. Cl.
*F16D 65/853* (2006.01)
*F16D 65/847* (2006.01)
(Continued)

(52) U.S. Cl.
CPC .............. *F16D 65/847* (2013.01); *B60T 5/00* (2013.01); *F16D 65/0068* (2013.01);
(Continued)

(58) Field of Classification Search
CPC .... F16D 65/847; F16D 65/0068; F16D 65/78; F16D 65/84; F16D 65/853;
(Continued)

(56) References Cited

U.S. PATENT DOCUMENTS 5,394,963 A * 3/1995 Deane ................ B22D 19/0072
188/264 D
5,558,183 A * 9/1996 Way ...................... F16D 65/853
188/264 CC
(Continued)

FOREIGN PATENT DOCUMENTS

DE 102013219250 3/2014
DE 102013219250 A1 * 3/2014 .............. B22F 3/105
(Continued)

OTHER PUBLICATIONS

U.S. Appl. No. 15/792,072, filed Oct. 24, 2017.

*Primary Examiner* — Thomas W Irvin
(74) *Attorney, Agent, or Firm* — Barnes & Thornburg LLP

(57) ABSTRACT

The present invention relates to a disc brake caliper body comprising a mounting side bracket and a non-mounting side bracket extending along a circumferential direction of the body, each bracket being configured to hold at least one brake pad. In order to provide improved cooling efficiency while maintaining the required stability of the brake caliper, the caliper body further comprises at least one cooling duct formed by additive manufacturing, at least one cooling duct being an integral part of the caliper body.

15 Claims, 18 Drawing Sheets

(51) Int. Cl.
  *B60T 5/00* (2006.01)
  *F16D 65/00* (2006.01)
  *F16D 65/84* (2006.01)
  *F16D 65/78* (2006.01)
(52) U.S. Cl.
  CPC .............. *F16D 65/78* (2013.01); *F16D 65/84* (2013.01); *F16D 2065/788* (2013.01); *F16D 2065/789* (2013.01); *F16D 2250/00* (2013.01)
(58) Field of Classification Search
  CPC ......... F16D 2065/788; F16D 2065/789; F16D 2065/784; F16D 2250/00
  See application file for complete search history.

(56) References Cited

U.S. PATENT DOCUMENTS

| | | | | |
|---|---|---|---|---|
| 6,321,880 | B2 * | 11/2001 | Nakamura | B60T 5/00 188/24.11 |
| 6,446,766 | B1 * | 9/2002 | Cornolti | F16D 55/228 188/264 A |
| 6,722,476 | B1 | 4/2004 | Cornolti | |
| 8,151,951 | B2 * | 4/2012 | Cornolti | F16D 65/847 188/264 AA |
| 8,448,753 | B2 * | 5/2013 | Petrini | F16D 65/847 188/71.6 |
| 8,672,100 | B2 | 3/2014 | Sato | |
| 8,807,298 | B2 | 8/2014 | Nanri | |
| 10,502,275 | B2 | 12/2019 | Piccoli | |
| 10,738,851 | B2 * | 8/2020 | Smith | F16D 65/0068 |
| 2007/0170020 | A1 | 7/2007 | Halasy-Wimmer | |
| 2008/0053759 | A1 | 3/2008 | Tait | |
| 2008/0185243 | A1 | 8/2008 | Previtali | |
| 2008/0277216 | A1 * | 11/2008 | Cornolti | F16D 55/228 188/264 AA |
| 2016/0184883 | A1 | 6/2016 | Arai | |
| 2018/0142746 | A1 | 5/2018 | Hodgkins | |
| 2018/0223924 | A1 | 8/2018 | Piccoli | |
| 2018/0328426 | A1 | 11/2018 | Blackwell | |
| 2018/0328431 | A1 | 11/2018 | Crippa | |

FOREIGN PATENT DOCUMENTS

| | | |
|---|---|---|
| EP | 1016804 | 7/2000 |
| EP | 1898116 | 3/2008 |
| JP | 2016102573 | 6/2016 |
| WO | 2007/1076535 | 7/2007 |
| WO | 2016/1174426 | 11/2016 |

* cited by examiner

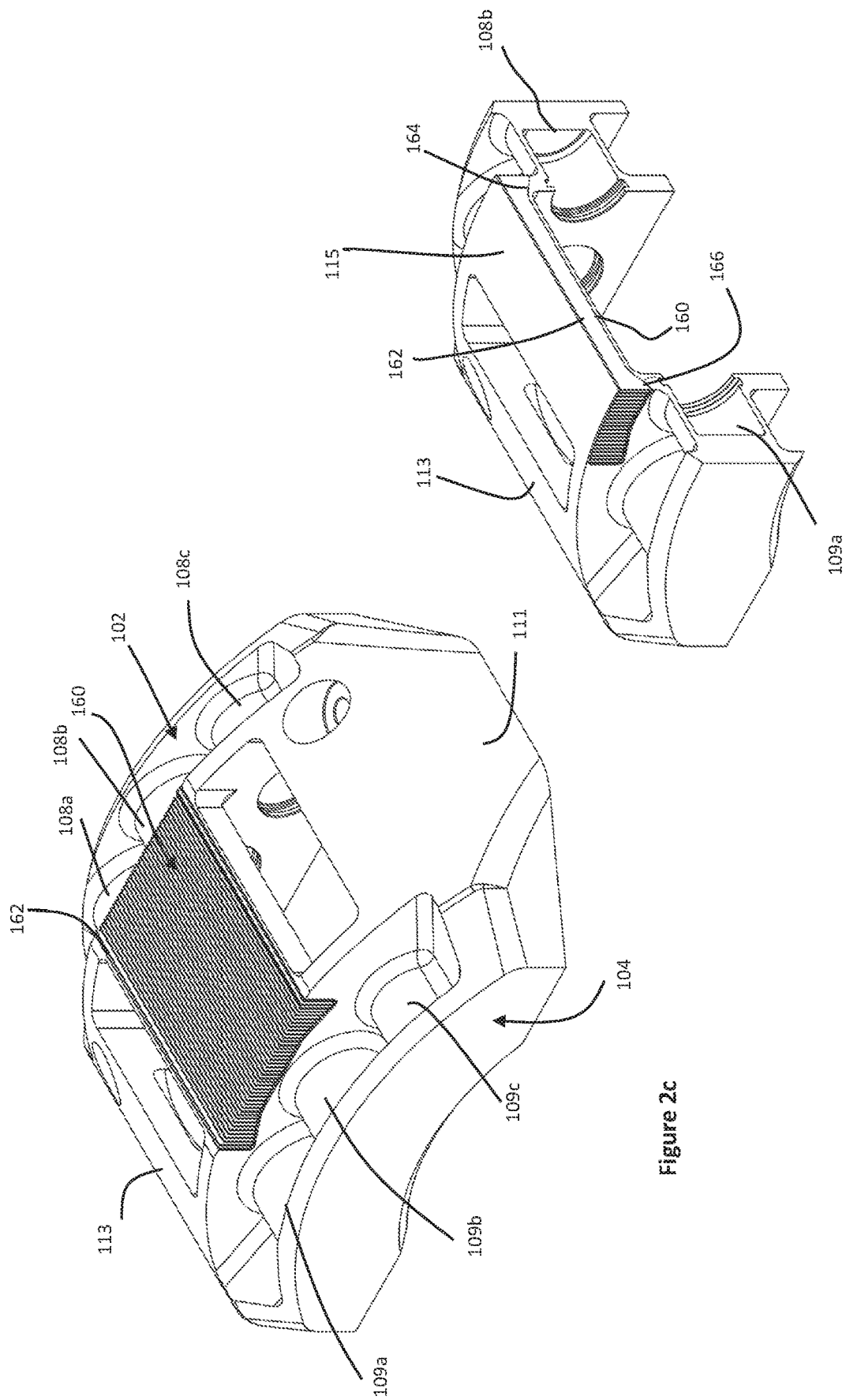

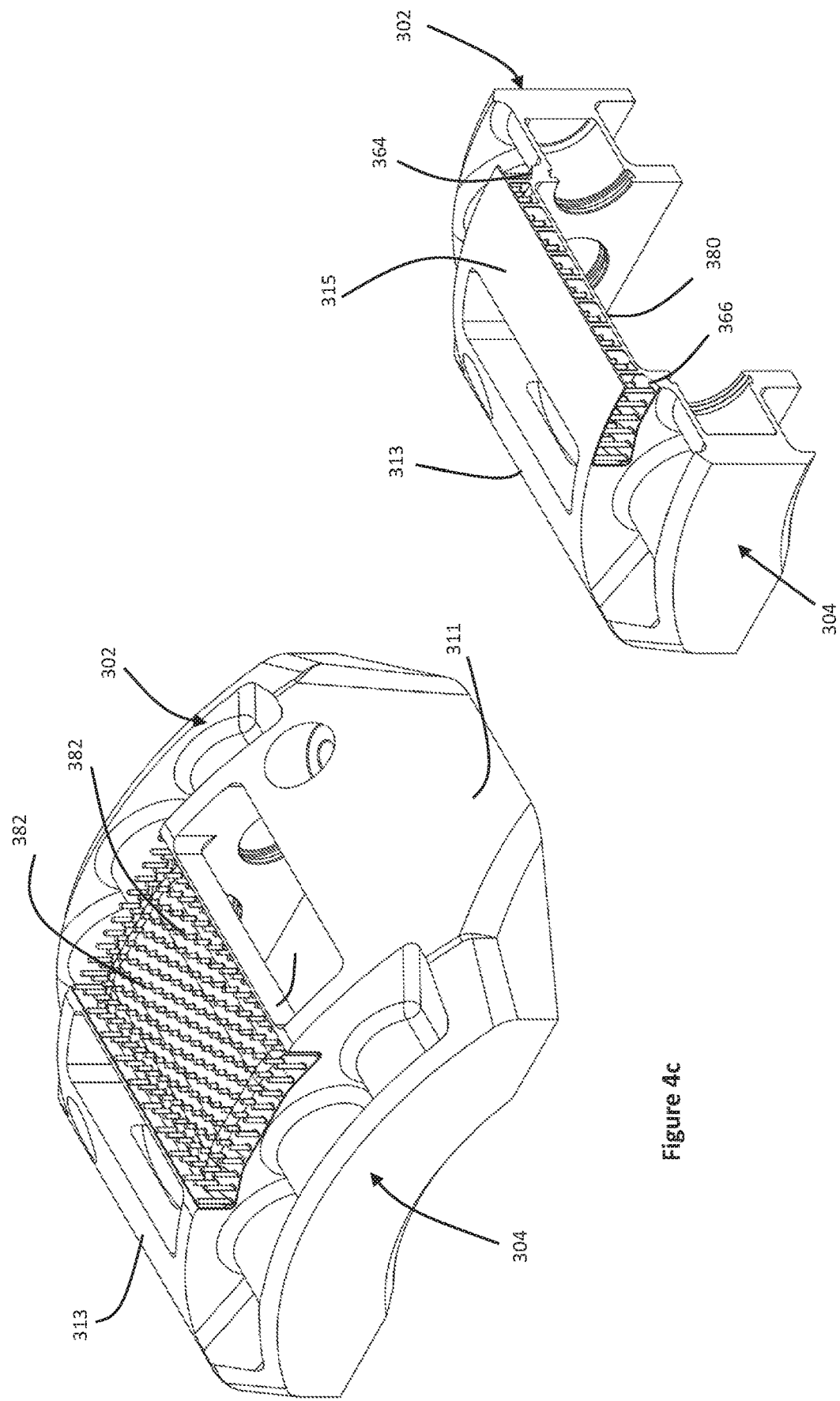

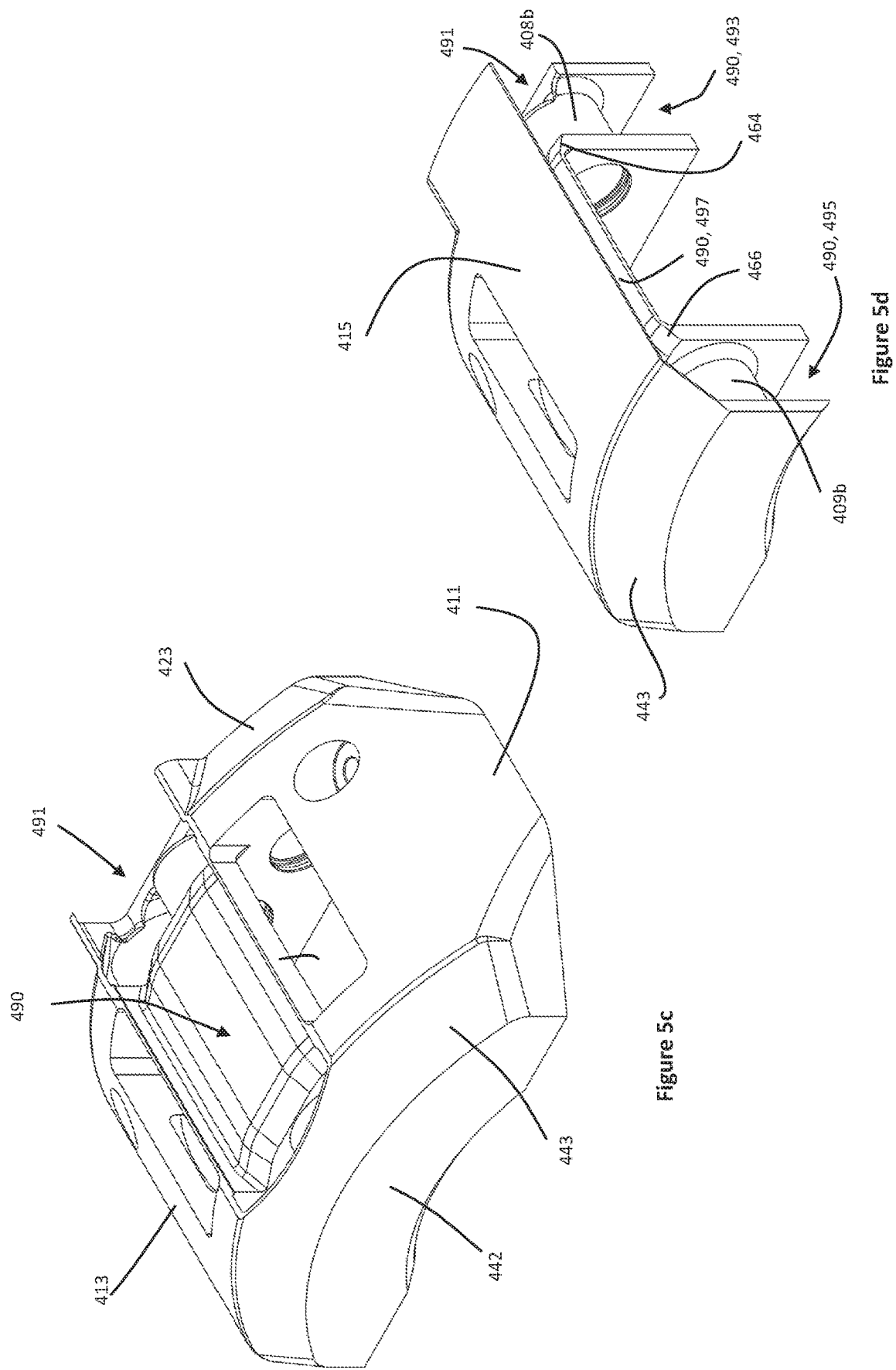

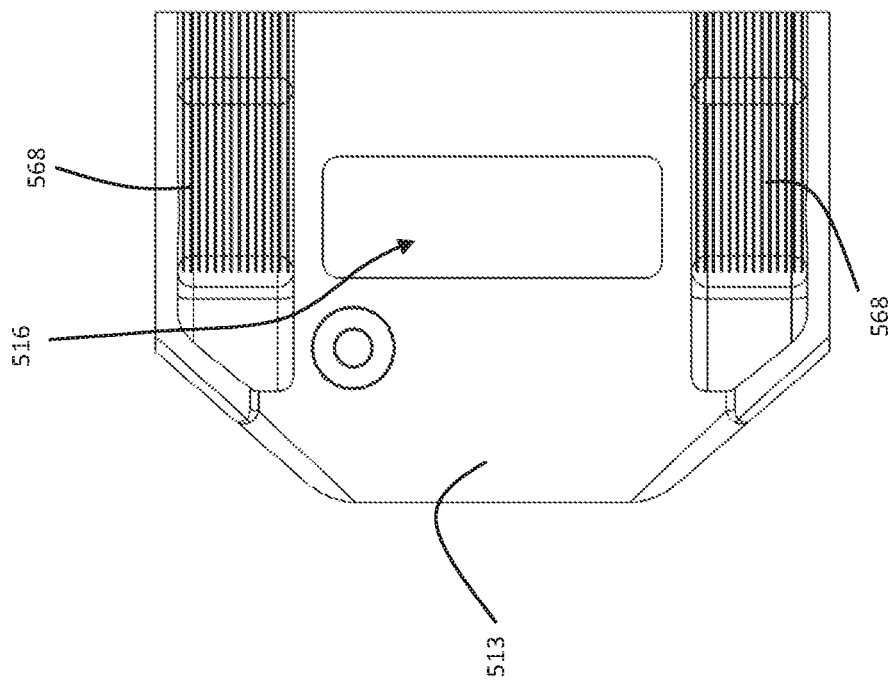
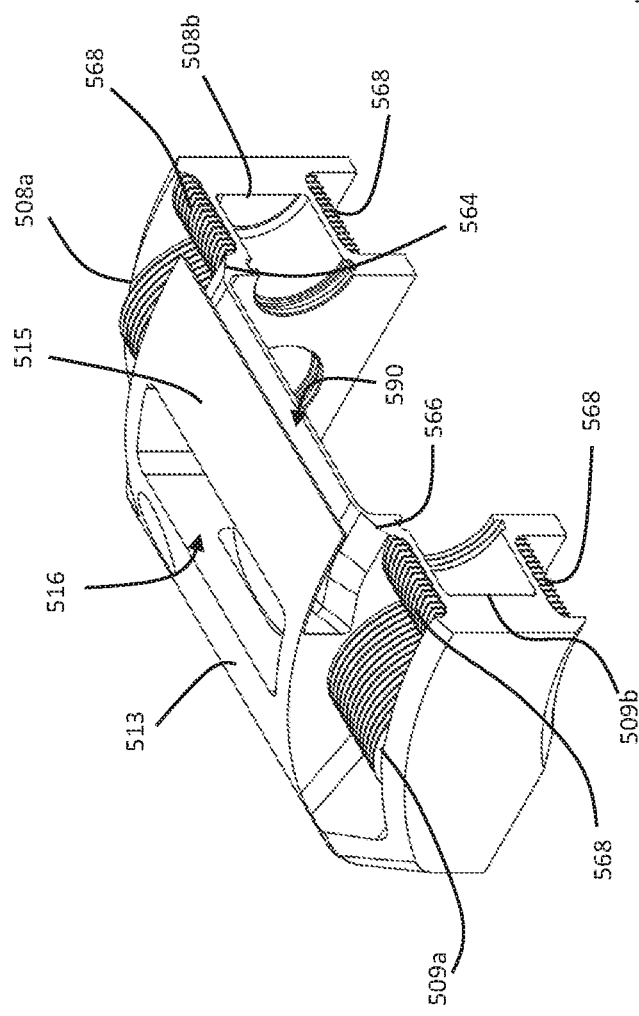
Figure 6c
Figure 6b

COOLING DUCTS FOR DISC BRAKE CALIPER AND METHOD OF MANUFACTURE THEREOF

CROSS REFERENCE TO RELATED APPLICATIONS

This application is a Divisional of U.S. patent application Ser. No. 15/792,072, filed Oct. 24, 2017, which claims priority to United Kingdom Patent Application No. 1618402.0, filed Oct. 27, 2016. The disclosures set forth in the referenced applications are incorporated herein by reference in their entirety.

The present invention relates to a disc brake caliper comprising at least one cooling duct and a method of manufacturer thereof. More specifically, the present invention is concerned with a disc brake caliper body comprising at least one cooling duct formed by additive manufacturing.

Brake calipers are well known in the art. Such calipers are arranged to actuate a pair of opposed brake pads to clamp a brake disc therebetween. Clamping of the brake disc retards motion of a vehicle to which the caliper is attached. Brake calipers come in various forms. For example, pin-slider type calipers utilise a cylinder or cylinders on a single side of the disc to advance one of the two opposed pads. Once the pad is in contact with the disc, the caliper (which is slidably mounted for movement in the direction of actuation) slides such that the opposing pad also contacts the disc to clamp it between the pads. Opposed-piston type calipers, which are more common in motor sports, have a static caliper with two post banks of cylinders, each of which advances a respective brake pad. As such, the caliper remains static but the disc is clamped between moving parts. In both cases, the general principle is the same—hydraulic pressure is increased in a cylinder to force two brake pads together to clamp a disc.

Known calipers comprise a brake caliper body which provides the strength and stiffness required to react to forces experienced under braking. The caliper body typically has two brackets, one either side of the plane of the brake disc, each bracket housing respective brake cylinders with associated pistons. Brake pads are mounted on a laterally inner face side of the caliper body for advancement towards the disc by pistons within the cylinders. The brackets are connected by one or more bridge members extending across, thereby straddling, the disc. Hydraulic fluid passages are attached to, and machined into, the caliper body to supply hydraulic fluid to the cylinders. For example, in a known brake caliper, an external hydraulic conduit is provided on the radial outer surface of one of the bridge members spanning the caliper. The conduit is placed in fluid communication with a passage drilled into the bracket extending to the cylinder.

The brake caliper bodies tend to be mounted to the vehicle at an inboard or body side (which is known as the mounting side bracket). The opposing bracket is known as the non-mounting side bracket.

Brake calipers tend to get very hot in use due to friction between the pads and disc when breaking loads are applied. Especially in racing cars, it is known that overheated brake calipers and discs will reduce the ability to slow the car and severely decrease durability of the brakes. In order to prevent overheating of the brake system, it is known to use air conduits in racing cars that route air flow towards an inboard side of the brake disc (rotor), which will increase the air flow rate through the brake rotor vanes, which in turn cool the rotor faster. The brake caliper body, on the other hand, can comprise separate cooling fluid channels which may be machined into the caliper body for the communication of cooling fluid, be that air, water or specific coolant around the brake caliper.

Conventionally known cooling ducts run coolant fluid around the caliper in cross-drilled passages to extract heat from the caliper and reduce the temperature of the housing. These are restricted by the constraints of machining, where the drillings have to be straight and then plugged. This restriction means that whilst a coolant can cool the caliper, it is not as efficient as it could be due to flow resistance created by sharp edges within the cooling ducts and the large distance between the cooling ducts and the cylinder housing portions or seals of the caliper.

In view of the above, it is an object of the present invention to provide a disc brake caliper body, which has improved cooling properties. It is a further object of the invention to provide the improved cooling effect without comprising the structural integrity of the brake caliper, which is subject to high loads during braking.

According to the present invention, there is provided a disc brake caliper body comprising a mounting side bracket and a non-mounting side bracket extending along a circumferential direction of the body, each bracket being configured to hold at least one brake pad. The new disc brake caliper body further comprises at least one cooling duct formed by additive manufacturing, the cooling duct being an integral part of the brake caliper body and extending continuously along its length.

As the skilled person will understand, the directions of a brake caliper are usually specified in relation to the brake disc. As such, the circumferential direction of the caliper is a direction parallel to the circumference of the rotor disc. The radial direction refers to radial vectors originating in the centre of the brake disc and could also be entitled as a direction from the bottom to the top of the brake caliper. Finally, the lateral direction of the brake caliper refers to the direction of the rotational axis of the brake disc. The lateral direction, therefore, extends perpendicular to the circumferential and the radial direction.

By manufacturing the cooling ducts in an additive manufacturing process, the ducts can be fully integrated into the brake caliper and comprise essentially any shape required for optimum cooling effects. To this end, it is preferable to produce the entire caliper body by additive manufacturing. However, in some embodiments, only the cooling duct may be produced by additive manufacturing, while other parts of the caliper may be formed by conventional machining steps. The additive layer manufactured cooling ducts can be provided significantly closer to other functional parts of the caliper body (e.g. cylinder housings and seals) than conventionally known, machined cooling ducts. Finally, the inventive manufacturing method not only makes the cooling duct more efficient in removing heat from the caliper body, but also offers improved structural stiffness to the caliper and enables further weight reductions, which are particularly critical in racing applications. The new caliper body requires significantly less machining and no drilling for production of the cooling duct. As such, there is no more requirement for plug inserts to stop the hydraulic fluid from leaking out of the caliper body.

The term "continuous" or "continuously" in this specification refers to a mathematical meaning, namely that the cooling duct extends along a path that is differentiable at any point along the length of the hydraulic fluid duct. In simple terms, the cooling duct does not exhibit any sudden bends or corners. Rather, every point of the side wall extends smoothly along the length of the at least one hydraulic fluid duct. The continuous shape of the hydraulic fluid duct has the advantage that pressure losses within the duct are minimised.

The at least one cooling duct is an integral part of the brake caliper body. Accordingly the parts of the caliper comprising the cooling duct may be entirely formed via additive manufacturing methods.

In another embodiment, the at least one cooling duct has a continuously curved shape, when viewed in plan. The curved shape of the cooling duct prevents cooling fluid from being trapped in corners or dead ends of the duct, which is conventionally known to increase the resistance to the cooling fluid flow provided by the master cylinder. In other words, the cooling duct of the present invention does not include sharp corners to avoid unnecessary resistance to the cooling fluid flow. Once again, the term "continuously" refers to a curvature that is differentiable at any point along the along the length of the hydraulic fluid duct.

In another embodiment, the brake caliper body may comprise one or more bridging members connecting the mounting and non-mounting side brackets in a substantially lateral direction, wherein the cooling duct extends at least partly through the one or more bridging members. According to this embodiment, the cooling duct can be used to transfer cooling fluid, such as the aforementioned routed air flow, from the mounting side of the caliper body towards the non-mounting side bracket, which is normally at least partly obstructed by the brake disc. The cooling ducts of this embodiment can extend through one or all of the bridging members, depending on the amount of cooling fluid required and the impact on stiffness of the caliper. According to this aspect, at least the bridging member is produced by additive manufacturing.

In another embodiment, the one or more bridging members comprise a first end bridge arranged and configured to connect leading ends of the brackets and a second end bridge arranged and configured to connect trailing ends of the brackets, wherein the cooling duct extends at least partly through the first and/or second end bridge. As will be described in more detail below, this embodiment enables the pad gap to be free from ducting, which facilitates a quick and easy brake pad change, without having to avoid cooling ducts extending across the pad gap.

According to another embodiment, the cooling duct comprises a first opening on a mounting side of the first end bridge and a second opening on a mounting side of the second end bridge, the cooling duct extending through the first end bridge, the non-mounting side bracket and the second end bridge between the fluid opening and the second opening. According to this aspect, the fluid flow can be circulated around the inside of the caliper to enter and exit in the optimal position, such as the mounting side of the brake caliper. This is particularly useful in connection with the aforementioned cooling air flow, which is routed towards the internal or mounting side of the brake disc.

According to another embodiment, the cooling duct extends in a substantially U-shaped manner between the air inlet and the air outlet, when viewed in plan. The U-shaped design of the cooling duct has the advantage that sharp turns and thus flow resistance within the cooling duct is avoided. Of course, the cooling duct may be constructed in another shape but it is preferred to provide the cooling duct with smooth corners to limit airflow resistance.

In another embodiment, the non-mounting side bracket comprises at least one cylinder housing adapted to receive a corresponding brake piston, wherein at least a portion of the cooling duct extends around an outer circumference of the at least one cylinder housing. In other words, the cooling duct of this embodiment may be formed to surround the at least one cylinder housing of the non-mounting side bracket between the non-mounting side ends of the first and second end bridges.

According to another aspect, the one or more bridging members comprise a central bridge arranged between a leading end and a trailing end of the caliper body, the cooling duct extending at least partly through the central bridge. Accordingly, the cooling duct is centrally arranged with respect to the caliper body and extends over the part of the body where the cylinder housings are situated and the most heat is created. Of course, the cooling duct within the central bridge can be formed in addition to the U-shaped cooling duct within the first and second end bridges described hereinbefore.

In another embodiment, the cooling duct extends between laterally inner faces of the mounting and non-mounting side brackets. The laterally inner faces of the mounting and non-mounting side brackets correspond to the outlet side of the cylinder housings on which the brake pads are mounted. In other words, the laterally inner faces of the mounting and non-mounting side brackets are the surfaces facing the brake disc in use. Alternatively, the cooling duct may extend between a laterally outer face of the mounting side bracket and cylinder housings of the non-mounting side bracket. According to this embodiment, the cooling duct extends essentially across the whole caliper from its mounting side end.

According to the alternative embodiment described hereinbefore, the cooling duct may comprise an air inlet arranged at the laterally outer face of the mounting side bracket along a radially outer end of the caliper body, wherein the cooling duct may comprise an air outlet located at a radially inner end of the caliper body. In other words, the cooling duct may be constructed to convey cooling fluid, such as cooling air, from a top end (radially outer end) of the mounting side bracket towards the lower end (radially inner end) of the non-mounting side bracket and the mounting side bracket respectively. In this particular embodiment, the cooling duct may be arranged to steer the cooling fluid flow from a substantially lateral direction into a radial direction across the cylinder housings of the side brackets.

In another embodiment, the cooling duct defines a cavity for conveying cooling fluid, the cavity comprising supplementary structures extending from an inner surface of the cooling duct, and wherein the structures are formed by additive manufacturing. The supplementary structures inside the cooling duct can be provided along the entire length of the cooling duct or just in predetermined places. The supplementary structures can be used for a variety of different purposes, such as increasing the surface area contacted by the cooling fluid, increasing the stiffness in predetermined, preferably high stress, areas of the cooling duct, and inducing turbulent air flow.

According to another embodiment, at least parts of the supplementary structures comprise a lattice structure having a partial skin. In this application, the terms "skin" is intended to mean a portion having a bulk density of substantially 100% of the material density from which it is formed. The term "lattice structure" is intended to mean a portion having a bulk density of 50% or less of material density from which it is formed. Advantageously, the lattice structure results in a strong, stiff, yet light design of the cooling duct. The skin may be external or internal of the lattice structure. The lattice structure may be arranged in parts of the cooling duct, which are subject to high bending stresses during use of the caliper body.

Preferably, the bulk density of 50% or less of the lattice structure is achieved by providing voids within the lattice structure of a volume greater than 50% of the cross-sectional area of the parts of the cooling duct, which comprise the lattice structure. More preferably, the voids have a percentage void volume of at least 70%, in other words the bulk density of lattice structure is preferably 30% or less. Most preferably, the voids have a percentage void volume of 90%, corresponding to a lattice bulk density of 10%. The lattice structure further provides greater surface area and local turbulences to the air flow, which can be used to increase cooling efficiency of the caliper.

According to another embodiment, at least parts of the supplementary structures comprise a plurality of vanes. The vanes may extend straight along the length of the cooling duct or in an undulating manner Similar to the lattice structure described hereinbefore, the vanes can provide bending strength and stiffness to the cooling duct and caliper body in areas exposed to high bending stresses. Furthermore, the vanes increase the surface area exposed to the cooling fluid flow to improve heat transfer from the caliper. The undulating vane design can be arranged such that a balance between laminar flow for moving air cooling fluid around the caliper, combined with local turbulences to maximise heat transfer can be obtained.

According to another embodiment, at least part of the supplementary structures may comprise substantially column shape reinforcement members, the reinforcement members extending in a substantially radial direction of the caliper body. The substantially column shaped reinforcement members will increase the stability of the cooling duct and brake caliper in areas of high bending stresses and provide for an increased surface area to improve heat rejection. Similar to the vane structures described hereinbefore, the columns can be located such that a balance between laminar flow for moving air around the caliper is combined with local turbulences, which form particularly behind the columns, to maximise the heat transfer obtained by the cooling duct of the present invention.

Of course, it should be noted that the aforementioned supplementary structures within the cooling duct are preferably only provided in certain areas, which either require improved stability or increased surface area or both. It is feasible to have more than one structure within the cooling duct, whereas other parts of the cooling duct may be completely free of these structures. Alternative structures include dendritic forms, high chrome structures, body centred cubic structures or gyroid structures. Preferably, any of the aforementioned structures are formed such that a minimum cross-sectional area of one square millimetre remains within the cooling duct.

According to another embodiment, the mounting side bracket and/or non-mounting side bracket comprise at least one cylinder housing adapted to receive a corresponding brake piston, wherein cooling vanes extend around an outer circumference of the at least one cylinder housing. According to one aspect, the cooling vanes of this embodiment comprise are attached to the outer diameter of the cylinder housings in areas where heat rejection is required to be maximised. While the vanes can be constructed together with the remaining parts of the cooling duct by means of additive manufacturing, it is also feasible to manufacture the vanes separately and attach the latter to the cylinder housings of the caliper retrospectively.

In another embodiment, the cooling duct is shaped such that, in use, a flow of cooling fluid is accelerated towards the cylinder housing portions. As such, the cooling duct may essentially be constructed in the shape of a nozzle directed towards the cylinder housing portions of the respective bracket. In other words, the cooling duct may compris a varying cross-sectional area along its length. This embodiment has the advantage that the flow rate of the cooling fluid may be increased and decreased according to the heat removal requirements along certain parts of the cooling duct.

While in the aforementioned embodiments the specific example of cooling air as the cooling fluid has been mentioned, it will be understood that any other cooling fluid, such as water or other liquids and gasses could be utilised equivalently.

According to a second aspect of the present invention, there is provided a method of forming a brake caliper, said method comprising:

providing a powder bath;

fusing powder in said bath, layer by layer, according to a digital record of a caliper body with a cooling duct, said cooling duct being an integral part of the brake caliper body and extending continuously along its length.

The digital record of the caliper body may be created using an FE simulation of the brake caliper body. During FE simulation, boundary conditions representing the load and heat development in use can be set to simulate the behaviour of the brake caliper body. Accordingly, one embodiment includes providing the cooling duct in high temperature and/or low stress areas of the caliper body simulated by the FE simulation. In areas of high stress and high temperature, the cooling duct can be provided with the internal structures described hereinbefore. As such, the method may include providing a lattice structure, vanes or reinforcement members within the cooling duct in said areas.

Exemplary embodiments of brake calipers in accordance with the present invention will now be described in more detail with reference to the attached drawings. The drawings show:

FIG. 1d is a perspective view of a vertical cross-section of the first embodiment of FIG. 1a;

FIG. 2b is a cross-sectional plan view of the caliper body shown in FIG. 2a;

FIG. 2c is a perspective view of the cross-sectional illustration of FIG. 2a;

FIG. 2d shows a perspective view of a vertical cross-section of the caliper body shown in FIG. 2a;

FIG. 3b is a cross-sectional plan view of the caliper body shown in FIG. 3a;

FIG. 3d is a vertical perspective cross-section of the caliper body shown in FIG. 3a;

FIG. 4b is a cross-sectional plan view of the caliper body shown in FIG. 4a;

FIG. 4c is a perspective view of the cross-section shown in FIG. 4b;

FIG. 4d is a perspective vertical cross-section of the caliper body shown n FIG. 4a;

FIG. 5b is a cross-sectional plan view of the caliper body shown in FIG. 5a;

FIG. 5c is a perspective view of the cross-section shown in FIG. 5b;

FIG. 5d is a perspective vertical cross-section of the caliper body shown in FIG. 5a;

FIG. 6b is a perspective vertical cross-section of the caliper body shown in FIG. 6a; and FIG. 6c is a cross-sectional plan view of FIG. 6b.

FIGS. 1a to 1d show a first embodiment of the brake caliper body of the present invention. The disc brake caliper body of the first embodiment comprises a mounting side bracket 2 and a non-mounting side bracket 4, the mounting side bracket 2 has at least one, usually two, mounting holes 6a and 6b adapted to receive fastening members for attaching the caliper body to the vehicle body. As such, the mounting side bracket is also known as the body side bracket, whilst the non-mounting side bracket can also be referred to as the cover side bracket.

Figure 1A:
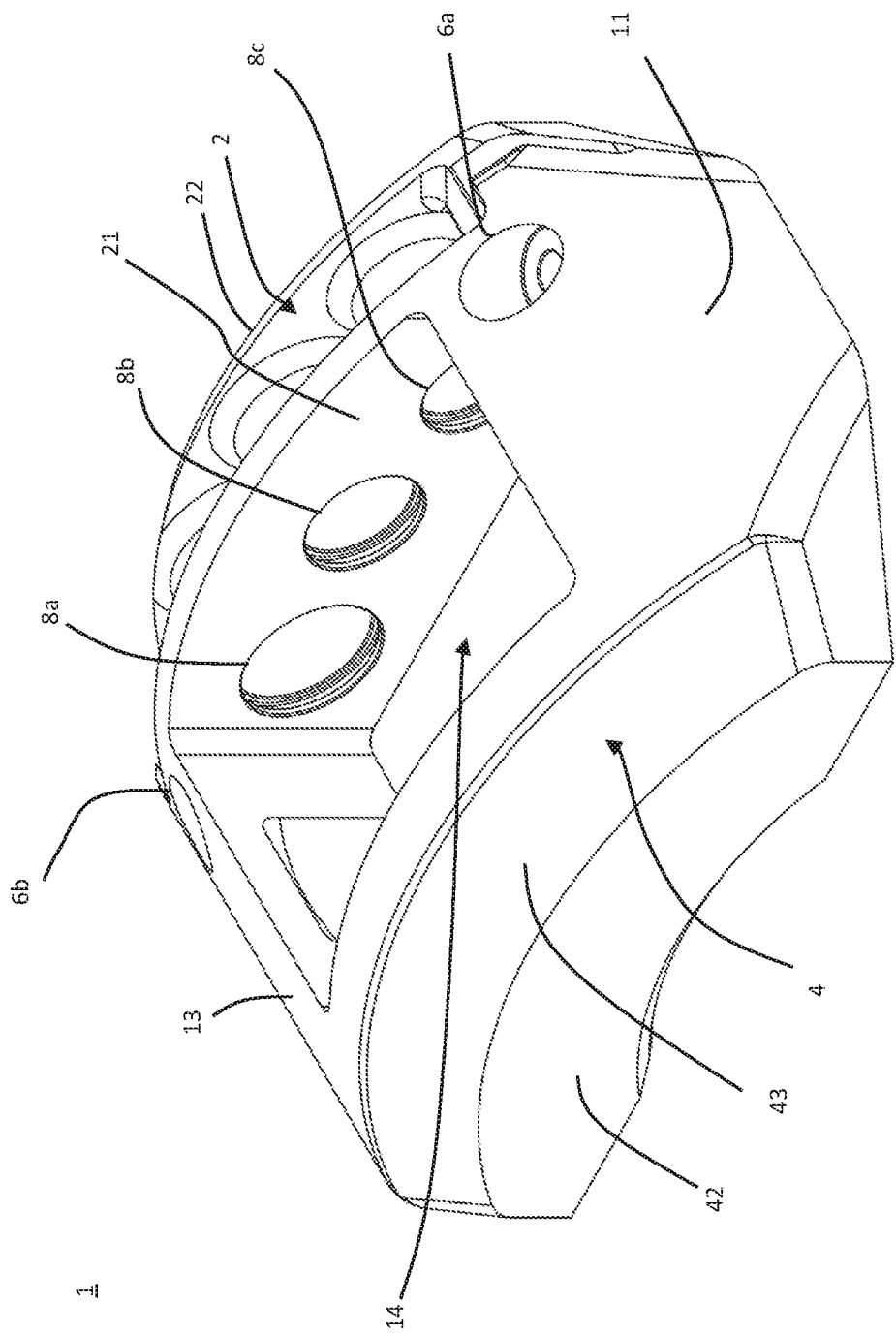
FIG. 1a is a perspective view of a first embodiment of the brake caliper body of the present invention.
Figure 1B:
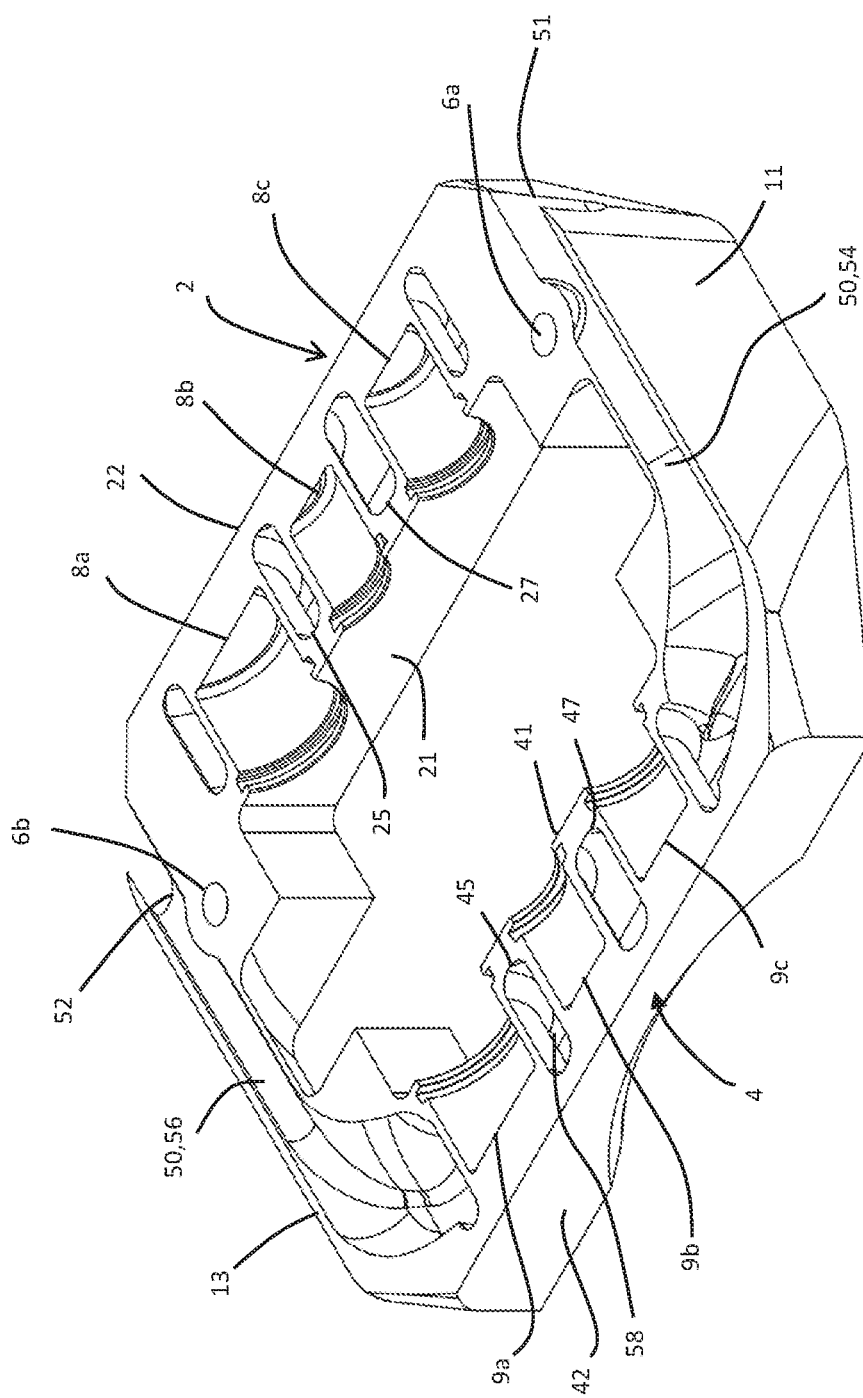
FIG. 1b is a perspective cross-section of the caliper shown in FIG. 1a, showing parts of the cooling ducts.

As can be derived from FIG. 1b, for example, each of the brackets 2, 4 comprises three cylinder housing portions 8a, 8b, 8c, 9a, 9b, 9c. The cylinder housing portions 8a, 8b, 8c, 9a, 9b, 9c of either bracket 2, 4 are arranged next to each other in the circumferential direction of the caliper body. In other words, their central axes are arranged along a common circumferential axis.

Each of the side brackets 2 and 4 has an inner surface 21, 41, which faces the brake disc, when the brake caliper body is mounted to straddle the latter. The inner surfaces 21, 41 are part of laterally inner side walls that connect front apertures of the cylinder housing portions 8a, 8b, 8c, 9a, 9b, 9c. Each side bracket 2, 4 further comprises an outer surface 22, 42, facing away from the brake disc, in use. The outer surfaces 22, 42 are part of laterally outer side walls connecting back ends of the cylinder housing portions 8a, 8b, 8c, 9a, 9b, 9c. As shown in FIG. 1a, the cylinder housing portions 9a, 9b and 9c are covered by a top cover 43 of the non-mounting side bracket 4, whereas the cylinder housing portions 8a, 8b and 8c are freely accessible from the top and bottom of the brake caliper body 1. As will be described in more detail below, the top cover 43 acts together with the aforesaid inner and outer side walls to form a cooling duct 50.

The cylinder housing portions 8a, 8b, 8c, 9a, 9b, 9c are arranged between the laterally inner and outer walls of the side brackets 2, 4. The cylinder housing portions 8a, 8b, 8c, 9a, 9b, 9c are configured to receive brake pistons, which in turn are arranged to hold a brake pad substantially parallel to the inner surface 21, 41 of the respective side brackets 2, 4.

FIG. 1a further shows bridging members 11 and 13. The bridging members 11, 13 of the first embodiment shown in FIGS. 1a to 1d are arranged at circumferential end portions of the brake caliper 1. As such, the brake caliper body 1 comprises a leading end bridging member 11 and a trailing end bridging member 13, the leading bridging member 11 being arranged along a leading circumferential end portion of the caliper body 1 and the trailing bridging member 13 being arranged along a trailing circumferential end portion of the caliper body 1. The leading and trailing ends of the caliper body 1 refer to the direction of rotation of the brake disc in use. During operation, parts of the brake disc will enter the caliper at the leading end, pass the brake pads at a central portion and exit the caliper again at the trailing end.

As can further be derived from FIG. 1a, the bridging members 11 and 13 connect the mounting and non-mounting side brackets 2, 4 in a substantially lateral direction. This arrangement provides for a central window 14, formed between the leading end bridging member 11, the trailing end bridging member 13 and the inner surfaces 21, 41. As shown, the central window provides easy access to the apertures of the cylinder housing portions 8a, 8b, 8c, 9a, 9b, 9c, and thus simplify inspection and replacement of the brake pads (not shown). In the first embodiment of FIGS. 1a to 1d, the brake caliper body 1 is depicted as a mono-block caliper, that is the side brackets 2, 4 and the bridging members 11, 13 are formed as a unitary structure. Alternatively, it is also feasible to produce the caliper body of the present invention as a multi-piece/modular caliper.

FIG. 1b shows a perspective cross-section of the caliper shown in FIG. 1a along a horizontal plane. A cooling duct 50, formed by means of additive manufacturing, extends through the caliper body 1. The cooling duct 50 is an integral part of the brake caliper body and in the first embodiment extends through both bridging members 11, 13. The cooling duct 50 extends between a first opening 51 and a second opening 52. The openings 51 and 52 are both arranged on a mounting side of the respective bridging member. A first portion 54 of the cooling duct extends in a substantially lateral direction through the leading end bridging member 11 between the mounting side opening 51 and the non-mounting side of the bridging member 11. A second portion 56 of the cooling duct 50 extends through the trailing end bridging member 13 in a substantially lateral direction between the mounting side opening 52 and the non-mounting side of the bridging member 13. At the non-mounting sides of the bridging members 11 and 13, the first and second portions 54 and 56 of the cooling duct 50 are connected via a third portion 58. The third portion 58 is formed between the laterally inner and outer surface walls and the top cover 43 of the non-mounting side bracket 4 and extends around the outer surface of the cylinder housing portions 9a, 9b and 9c. To facilitate air flow between side walls of adjacent cylinder housing portions 9a, 9b and 9c, the cylinder housing portions 9a, 9b, 9c are distanced in the circumferential direction and separated by slot likes openings 45 and 47 extending through the caliper body 1 in the radial directin. The third portion 58 of the cooling duct 50, therefore, extends around the entire circumference of each of the cylinder housing portions 9a, 9b, 9c. Similar slot like openings 25, 27 are provided between the cylinder housing portions 8a, 8b and 8c of the mounting side bracket.

Figure 1C:
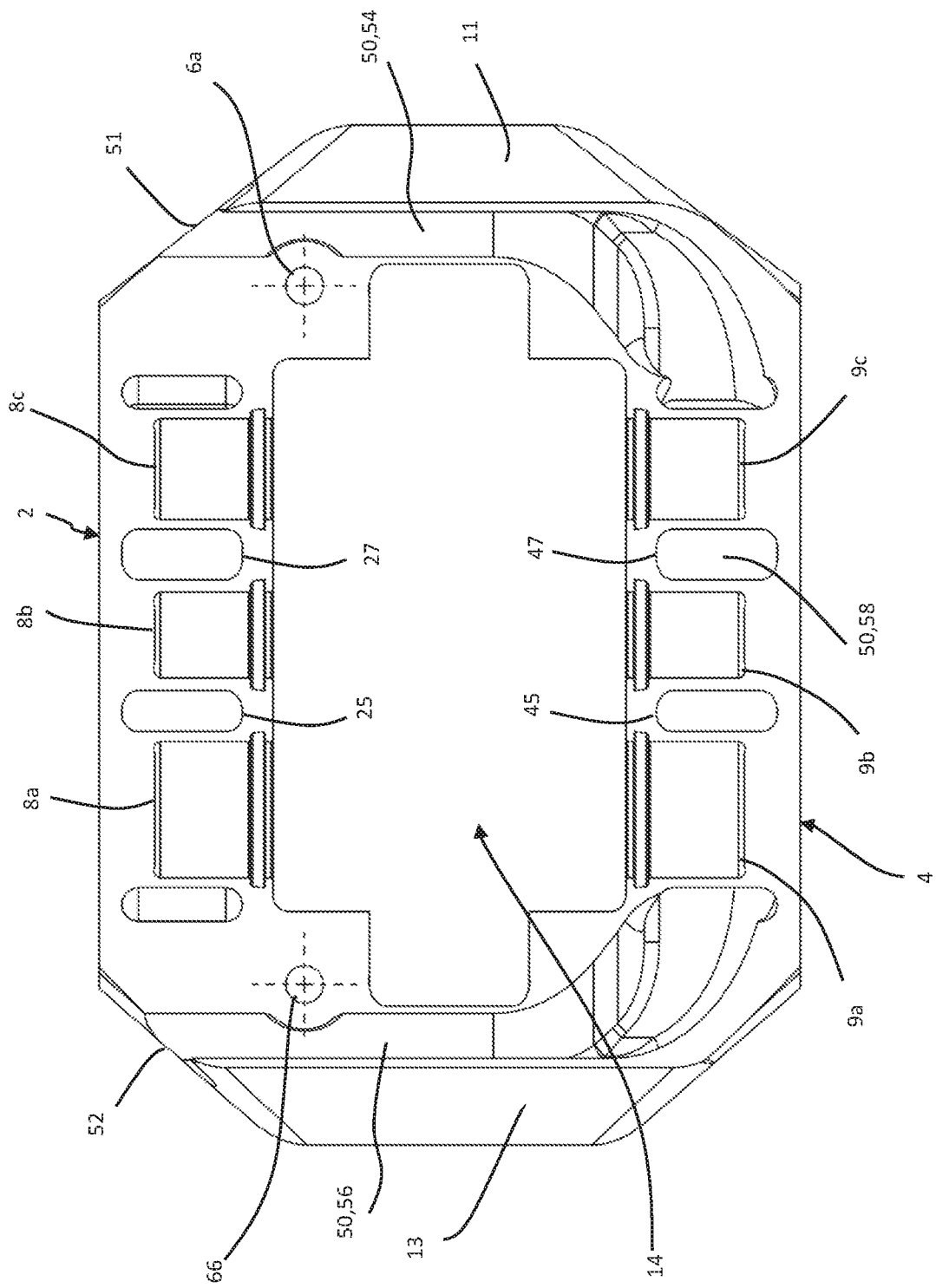
FIG. 1c is a plan view of the cross-section shown in FIG. 1b.
Figure 1D:
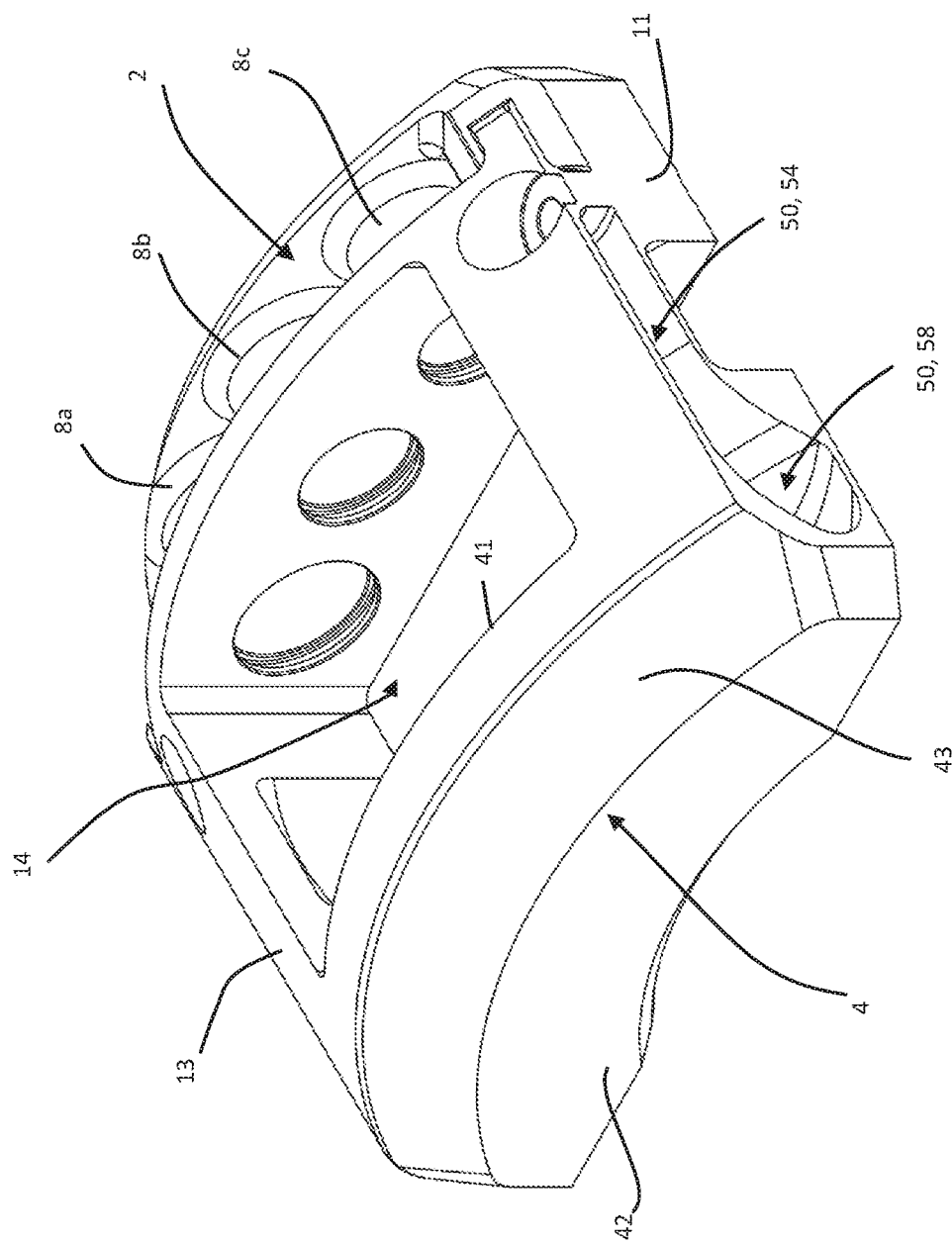
Figure 2A:
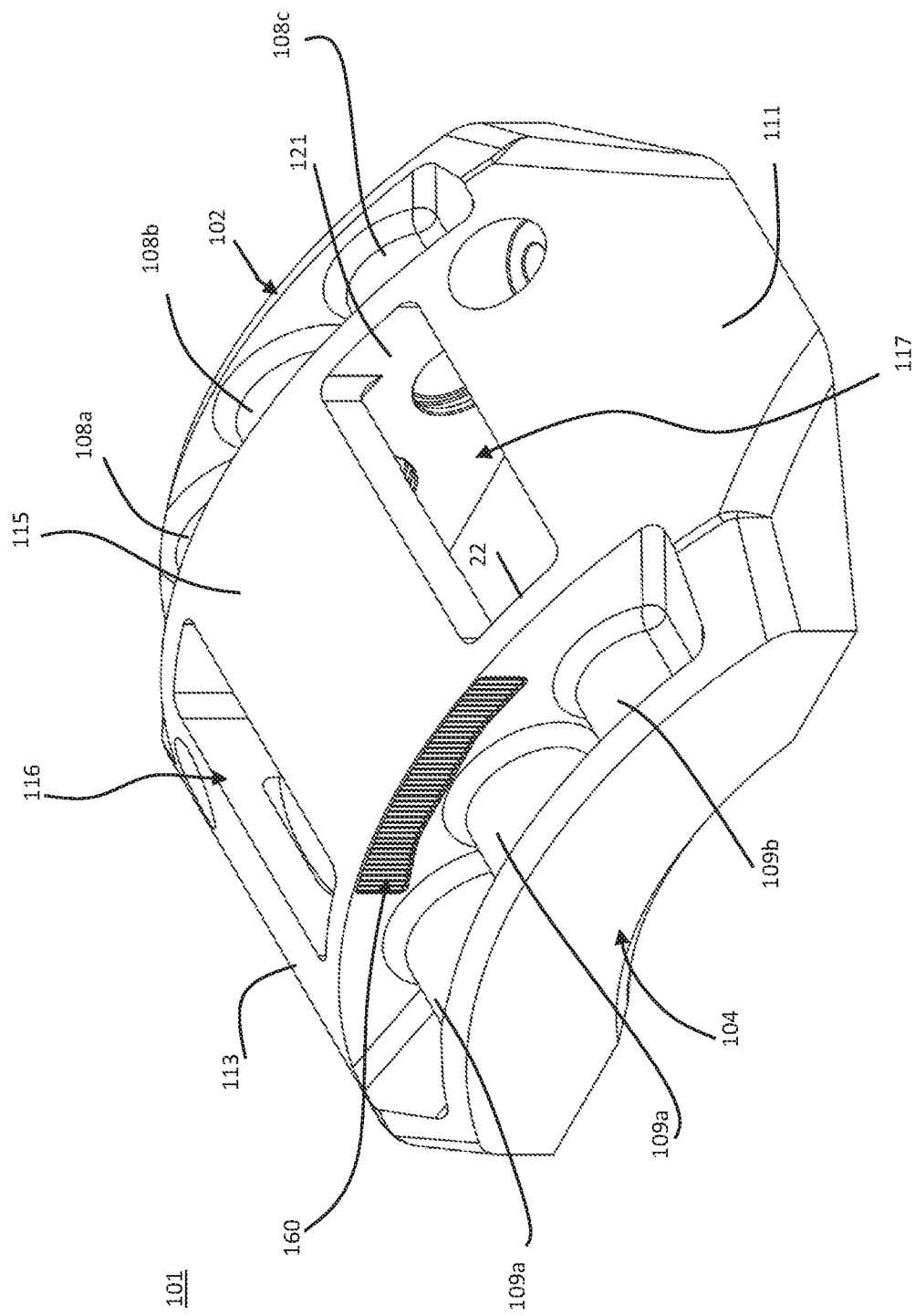
FIG. 2a is a perspective view of a second embodiment of the caliper body according to the present invention.
Figure 2B:
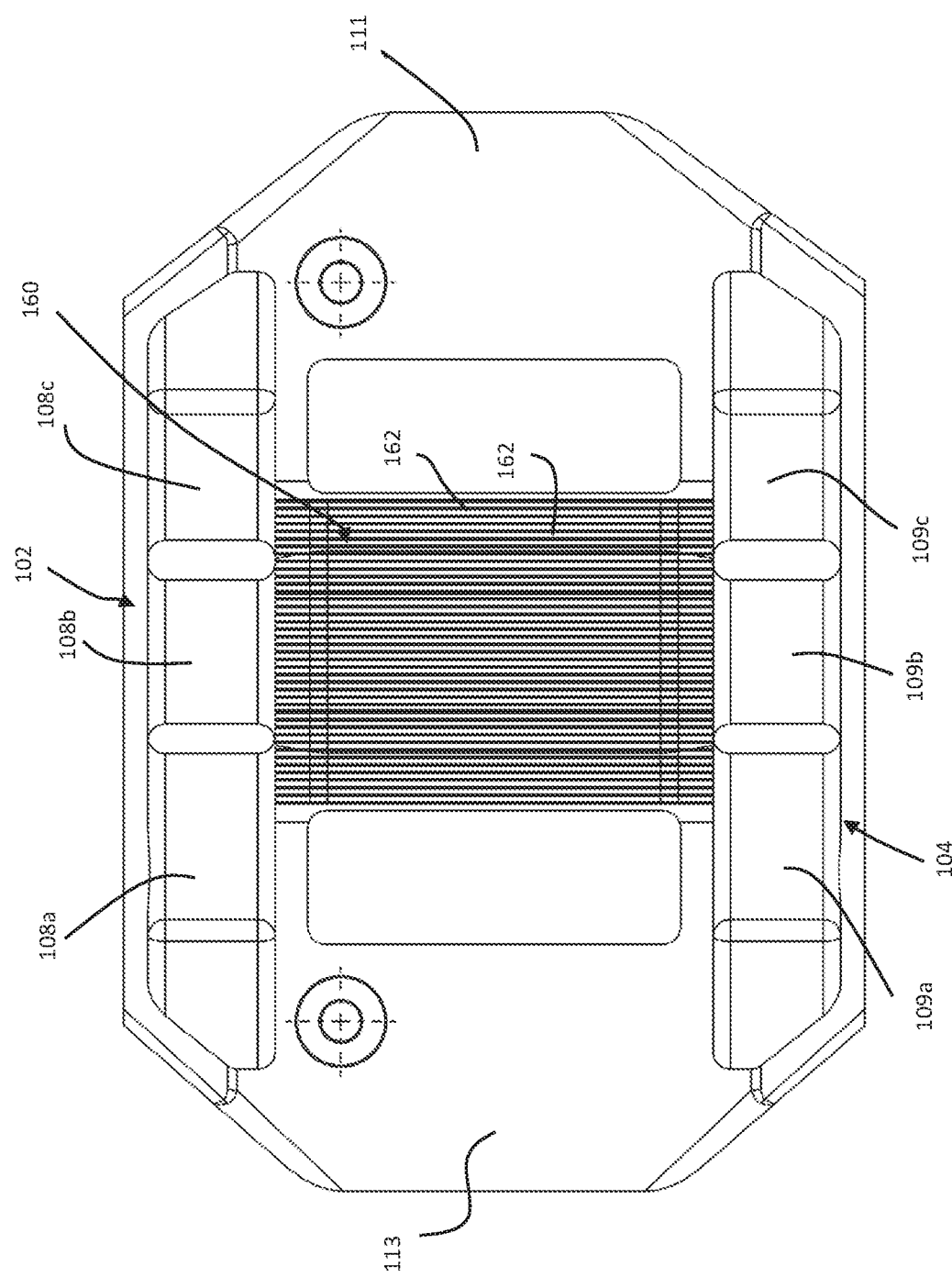

As can be seen in FIG. 1c, the cooling duct 50 has a substantially U-shaped form, when viewed in plan. The corners of the duct between the first portion 54 and the third portion 58 or the second portion 56 and the third portion 58 are rounded. This shape is obtained by manufacturing the cooling duct 50 via additive manufacturing methods rather than conventional machining steps. The rounded edges and corners of the cooling duct 50 leads to a more laminar air flow through the caliper body, which improves the cooling effect.

The cooling duct 50 of the first embodiment further has a varying cross-section along its length. In particular, while the first and second portions 54 and 56 have a first, substantially identical cross-section, the third portion has a second, larger cross-section. The second cross-section is sufficient to surround the entire circumferential surface of the cylinder housings 9a, 9b, 9c. The corners of the U-shaped duct 50 shown in FIG. 1c are constructed as transitioning portions, in which the diameter of the cooling duct 50 expands gradually from the first diameter to the second diameter.

A second embodiment of the brake caliper body according to the present invention is shown in FIGS. 2a to 2d. Corresponding parts of the first and second embodiment are labelled with corresponding reference signs increased by "100". The caliper body 101 of the second embodiment again comprises a mounting side bracket 102 and a non-mounting side bracket 104, which are connected by leading and trailing end bridging members 111, 113. The side brackets 102, 104 comprise three cylinder housing portions 108a, 108b, 108c, 109a, 109b, 109c.

In addition to the first and second end bridges 111, 113, the caliper body 101 further comprises another bridging member arranged centrally between the leading end and the trailing end of the caliper body 101. This third bridging member is constructed as a central bridge 115 and extends in a substantially lateral direction between the non-mounting side bracket and the mounting side bracket 102, 104. As can be derived from FIG. 2a, the central bridge 115 extends between the inner surfaces 121, 141 of the side brackets 102 and 104 respectively.

A cooling duct 160 extends through the central bridge 115 in a substantially lateral direction. The cooling duct 160 is provided with a plurality of vanes 162. The vanes 162 act to increase the surface area on which the cooling air flow is applied. As particularly shown in FIGS. 2b and 2c, the plurality of vanes 162 extend substantially straight along the length of the cooling duct, that is, in a lateral direction of the caliper body 101.

The cooling duct 160 of the second embodiment has a varying cross-section along its length. FIG. 2d shows that first and second end portions 164, 166 of the cooling duct 160 have a wider cross-section than the central portion of the cooling 160. To this end, the first and second end portions 164, 166 have a flared profile to gradually increase the cross-section of the cooling duct 160 towards the cylinder housing portions 108a, 108b, 108c, 109a, 109b, 109c. The flared first end portion 164 will increase fluid flow (e.g. air flow) intake along the mounting side of the caliper body 1, while the flared second end portion 166 is adapted to direct the cooling fluid towards the cylinder housing portions 109a, 109b, 109c. In contrast to the first embodiment, it should be noted that the cover or non-mounting side bracket 4 of the second embodiment does not comprise a top cover above the cylinder housing portions 109a, 109b, 109c.

A third embodiment of the brake caliper body is shown in FIGS. 3a to 3d. Corresponding parts of the first and third embodiment are labelled with corresponding reference signs increased by "200".

Figure 3A:
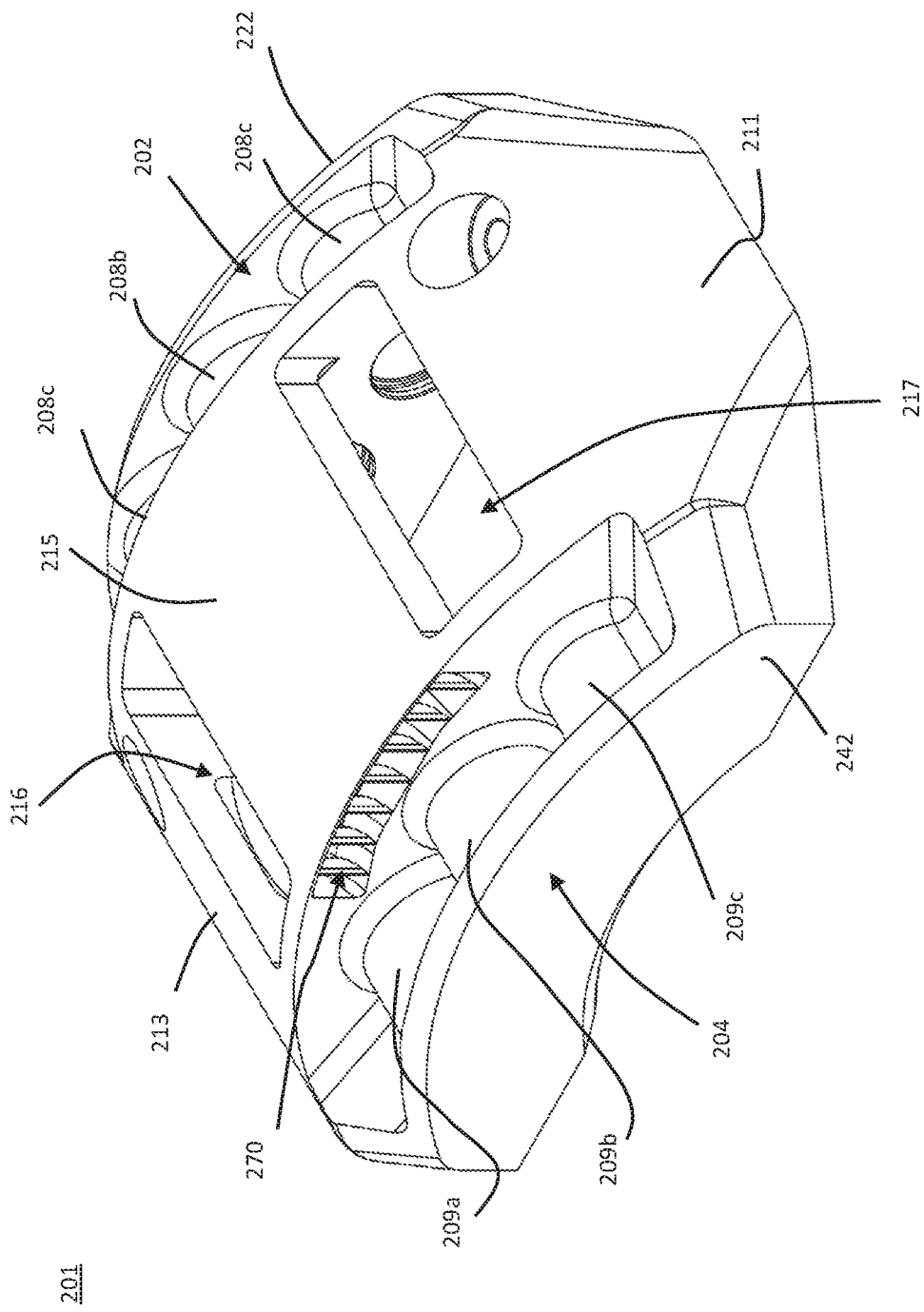
FIG. 3a is a perspective view a third embodiment of the caliper of the present invention.
Figure 3B:
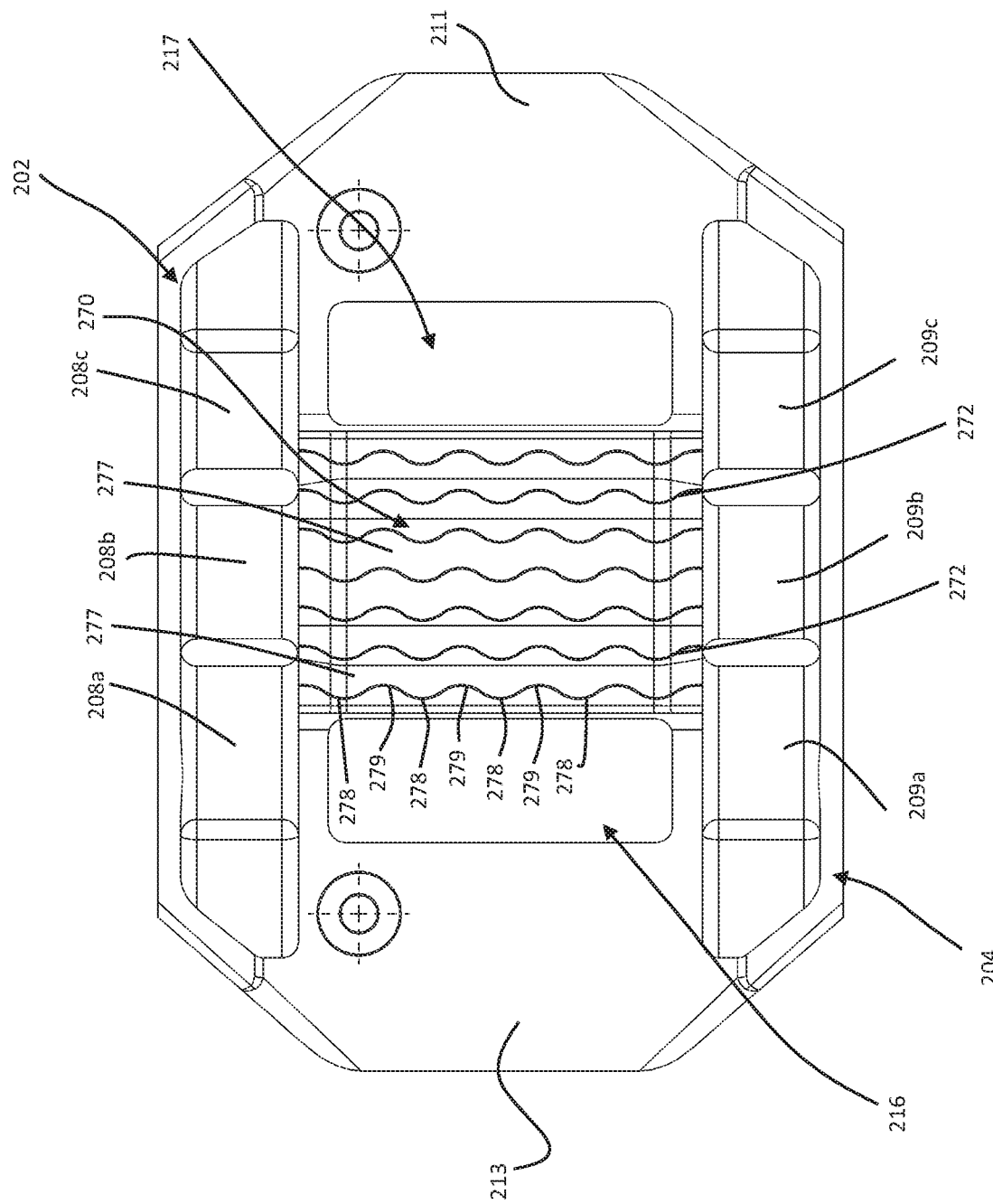
Figure 3C:
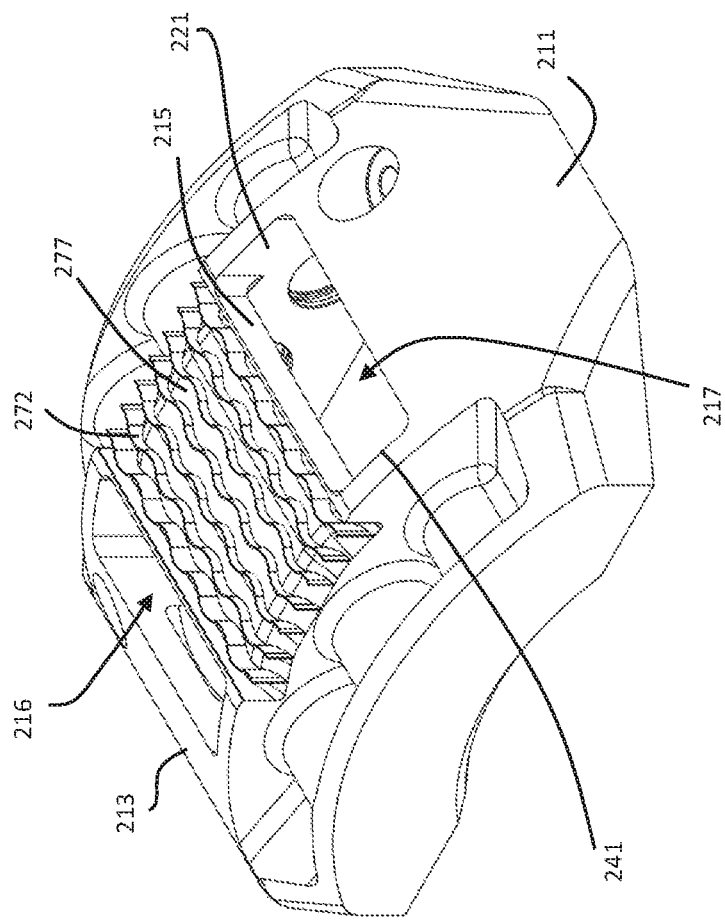
FIG. 3c is a perspective view of the cross-section shown in FIG. 3b.
Figure 3D:
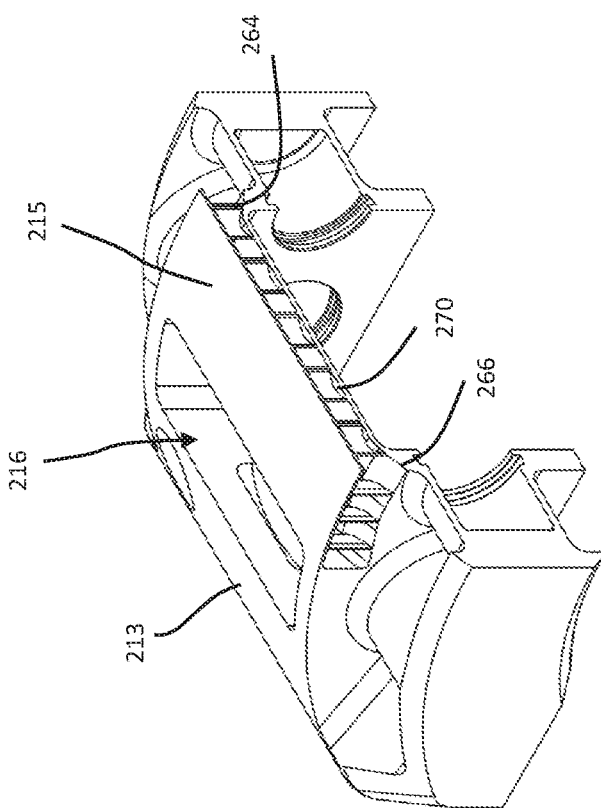

The brake caliper body 201 of the third embodiment is substantially identical to the brake caliper body 101 of the second embodiment. However, a cooling duct 270 of the third embodiment, which extends through central bridge 215 comprises a plurality of vanes 272 having a substantially undulating shape. The undulating shape of vanes 272 is best shown in FIG. 3b. The undulating vanes 272 comprise alternating valleys 278 and peaks 279. It is further shown that valleys 278 of adjacent vanes are aligned along the length of the cooling duct 270. In other words, each valley 278 of a first vane faces a valley of a second, adjacent vane. Similarly, the peaks of adjacent vanes are also aligned along the length of the cooling duct 270. Accordingly, the width of cooling channels 277 formed between the plurality of vanes is substantially constant along the length of the cooling duct 270. Alternatively, it is also feasible to align peaks of one vane with valleys of an adjacent vane, thereby creating cooling ducts with varying flow diameters.

Figure 4A:
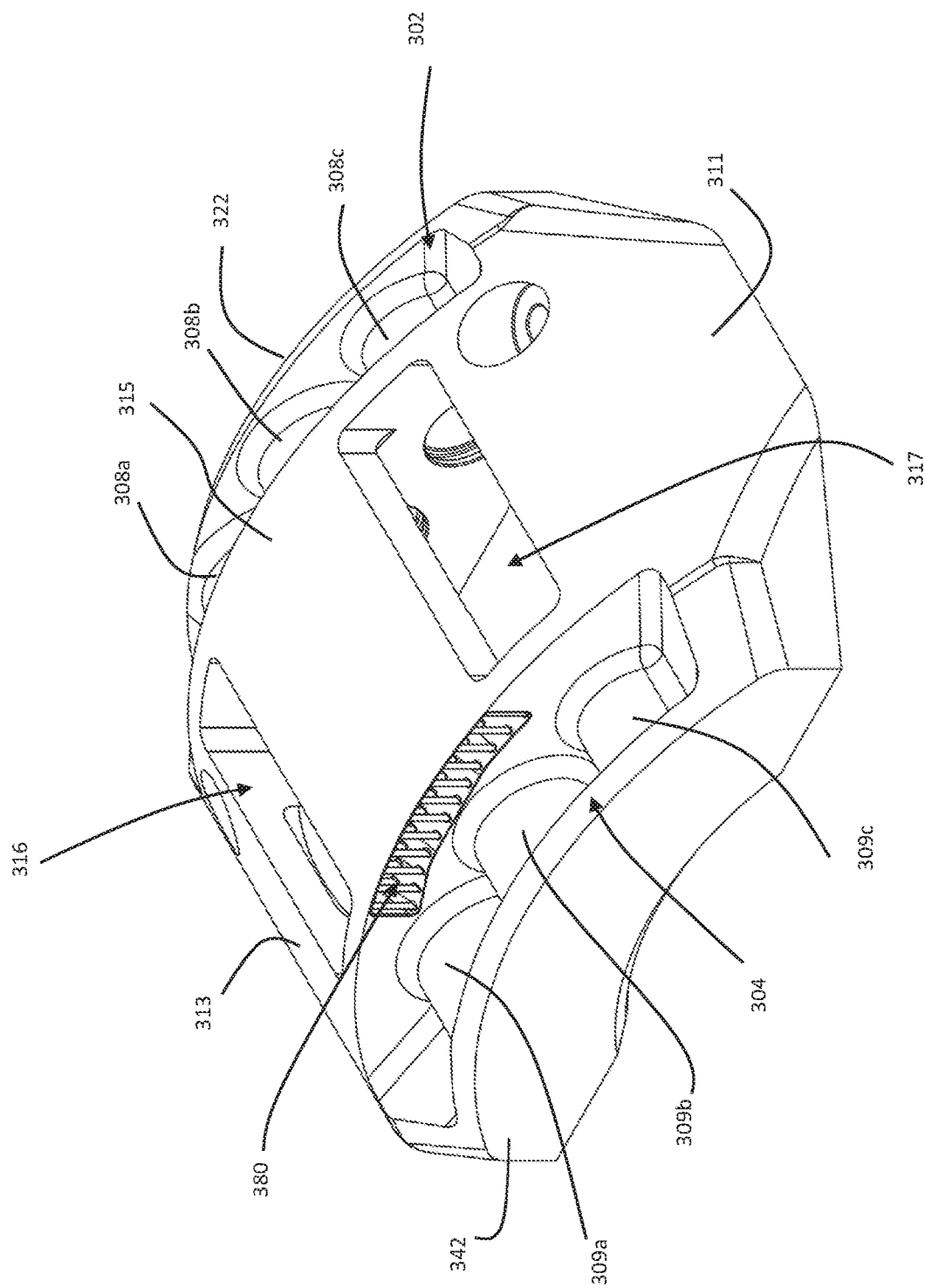
FIG. 4a is a perspective view of a fourth embodiment of a caliper body according to the present invention.
Figure 4B:
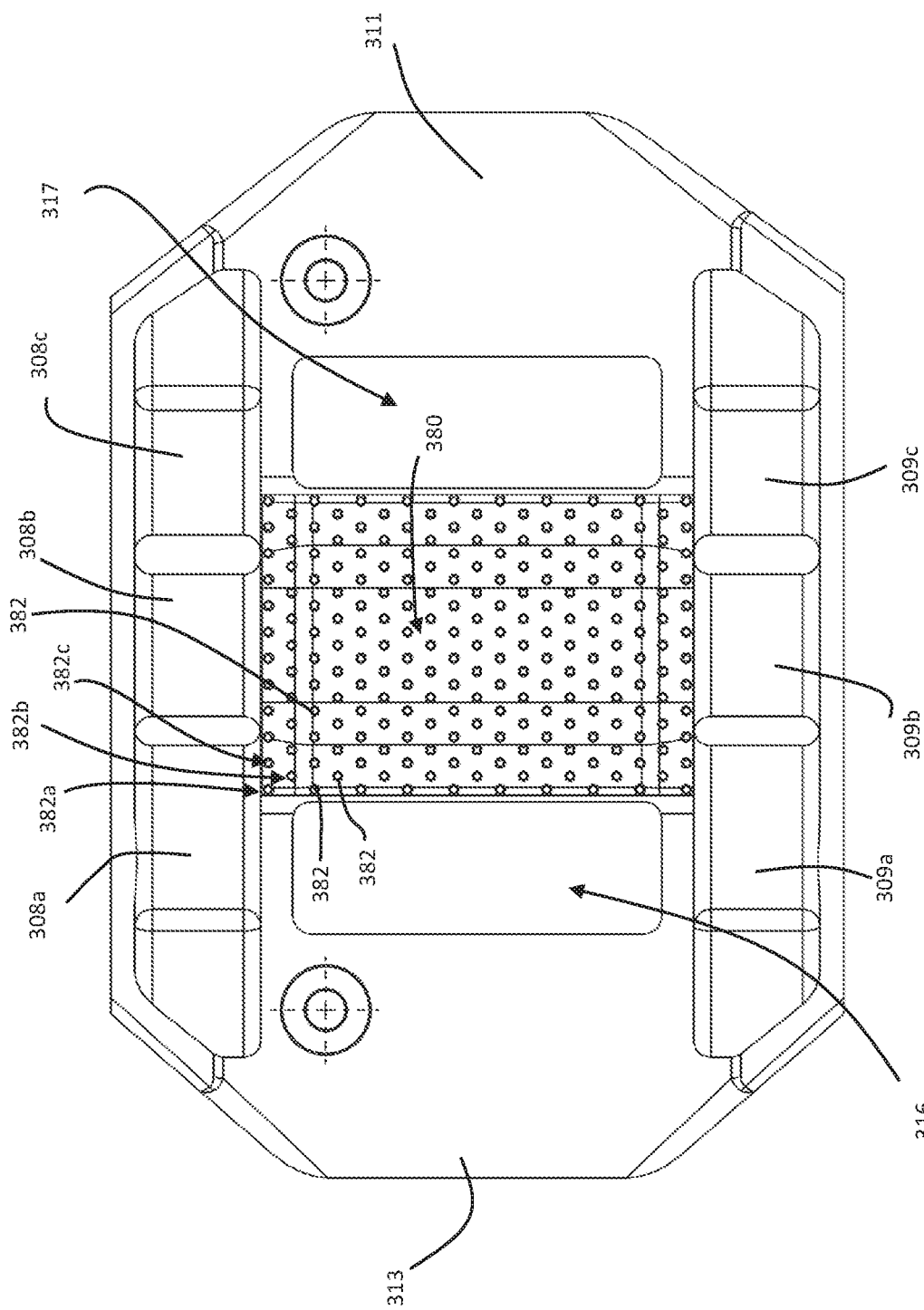

A fourth embodiment of the brake caliper body according to the present invention is shown in FIGS. 4a to 4d. Corresponding parts of the first and fourth embodiment are labelled with corresponding reference signs increased by "400". The general structure of the brake caliper body 301 of the fourth embodiment mainly corresponds to the shape of the caliper body 101 and 201 of the second and third embodiments. However, in contrast to the second and third embodiments, the cooling duct 380 of the fourth embodiment comprises a plurality of column shaped reinforcement members 382 extending in a substantially radial direction of the caliper body 301 within the cooling duct 380. The column shaped reinforcement members 382 shown in FIG. 4b are arranged in offset rows along the length of cooling duct 380. In more detail, a first row 382a of reinforcement members 382 has a plurality of reinforcement members 382 arranged equidistantly along the length of the cooling duct 380. A second row 382b of column shaped reinforcement members 382 is arranged adjacent to the first row 382a and, in turn, comprises a plurality of column shaped reinforcement members 382 arranged equidistantly along the length of the cooling duct 380. The distance between the reinforcement members 382 in the first row 382a is identical to the distance between reinforcement members 382 in the second, adjacent row 382b. However, the adjacent first and second rows 382a, 382b are offset with respect to each other, such that reinforcement members 382 of the second row 382b are arranged between reinforcement members 382 of the first row 382a. In particular, the reinforcement members 382 of the second row 382b are arranged half-way between reinforcement members 382 of the first row 382a, along the length of the cooling duct 380. A third row 282c, which is arranged adjacent to second row 382b comprises column shaped reinforcement members 382, which are aligned with the reinforcement member 382 of the first row 382a.

Figure 5A:
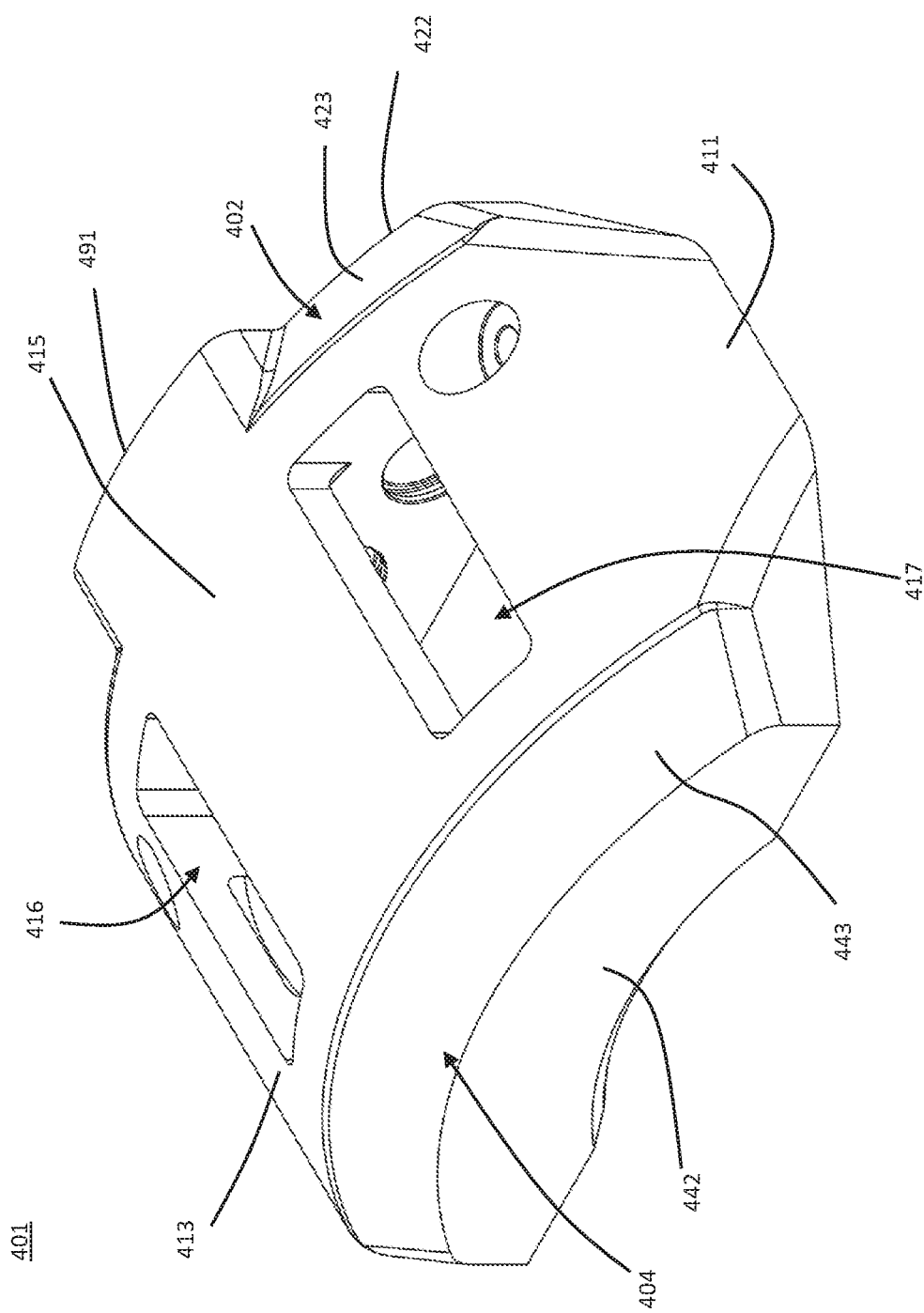
FIG. 5a is a perspective view of a fifth embodiment of the caliper body according to the present invention.
Figure 5B:
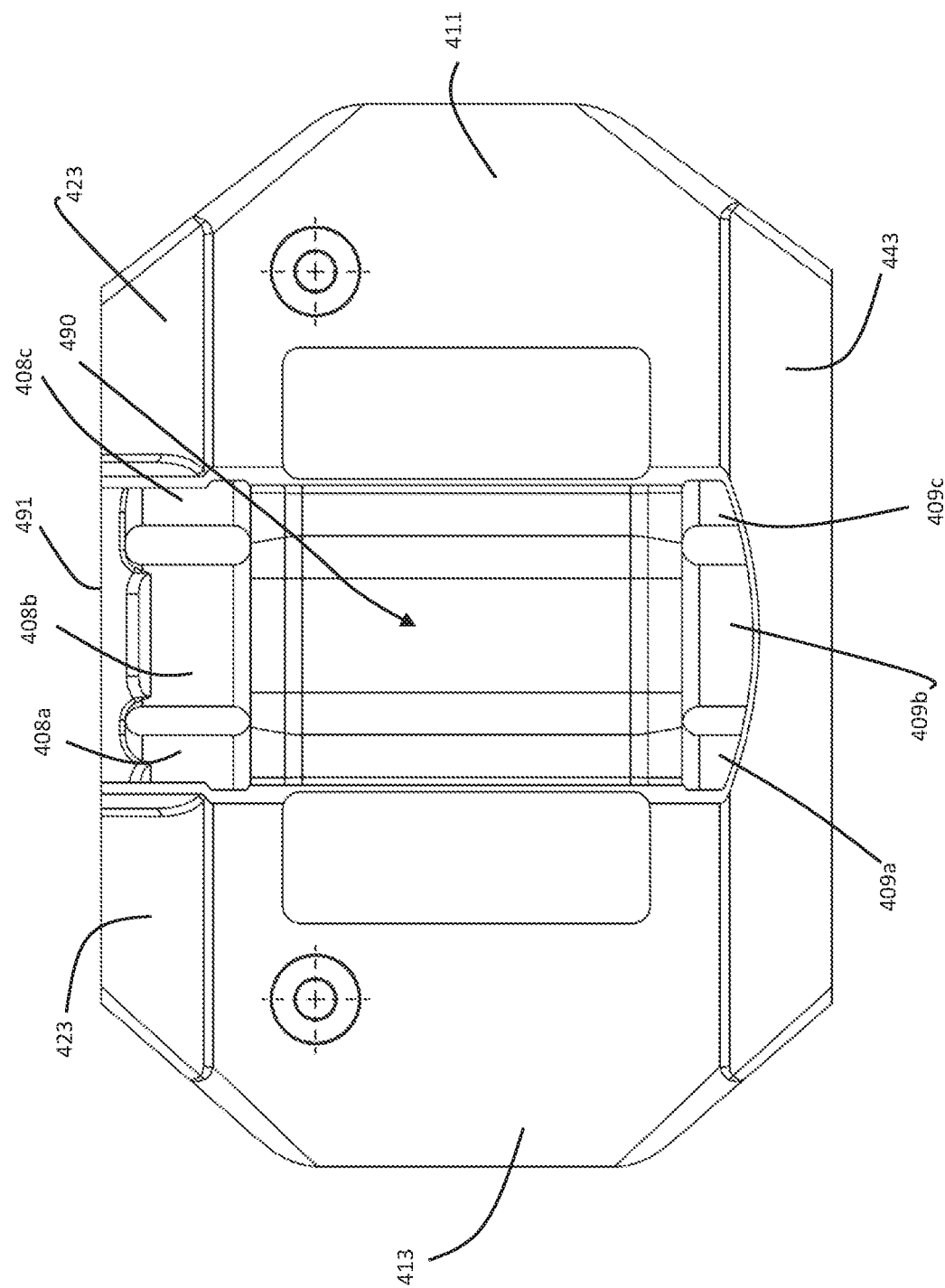

A fourth embodiment of the caliper body according to the present invention is shown in FIGS. 5a to 5d. Corresponding parts of the first and fifth embodiment are labelled with corresponding reference signs increased by "400". The caliper body 401 of the fifth embodiment comprises mounting side and non-mounting side brackets 402, 404, both of which are substantially closed along their upper end by top covers 443, 423. A cooling duct 490 extends from the laterally outer surface 422 of the mounting side bracket 402 along the lateral direction of the caliper body 401 via a central bridge 415. Air entering the cooling duct 490 via fluid inlet 491 can be distributed across the cylinder housing portions 408a, 408b, 408c of the non-mounting side bracket 402 and the cylinder housing portions 409a, 409b, 409c of the mounting side bracket 404 via central bridge 415. In other words, cooling duct 490 extends in a substantially U-shaped manner when viewed from a lateral cross-section of the caliper body 401 (FIG. 5d). The U-shaped cooling duct 490 comprises a first portion 493 extending in a radial direction around the cylinder housing portions 408a, 408b, 408c of the non-mounting side bracket 402 and a second portion 495 extending around cylinder housing portions 409a, 409b, 409c of the non-mounting side bracket 404. A third portion 497 formed by the central bridge 415 extends in a substantially lateral direction between the first and second portions 493, 495, to direct cooling fluid flow that enters the first portion 493 via fluid inlet 491 towards the second portion 495. While FIGS. 5*a* to 5*d* show a substantially empty third portion 497 of cooling duct 490, it is feasible to introduce vanes or columns, similar to the second to fourth embodiments discussed hereinabove, to increase the cooling effect and/or increase stability of the central bridge 415.

Figure 6A:
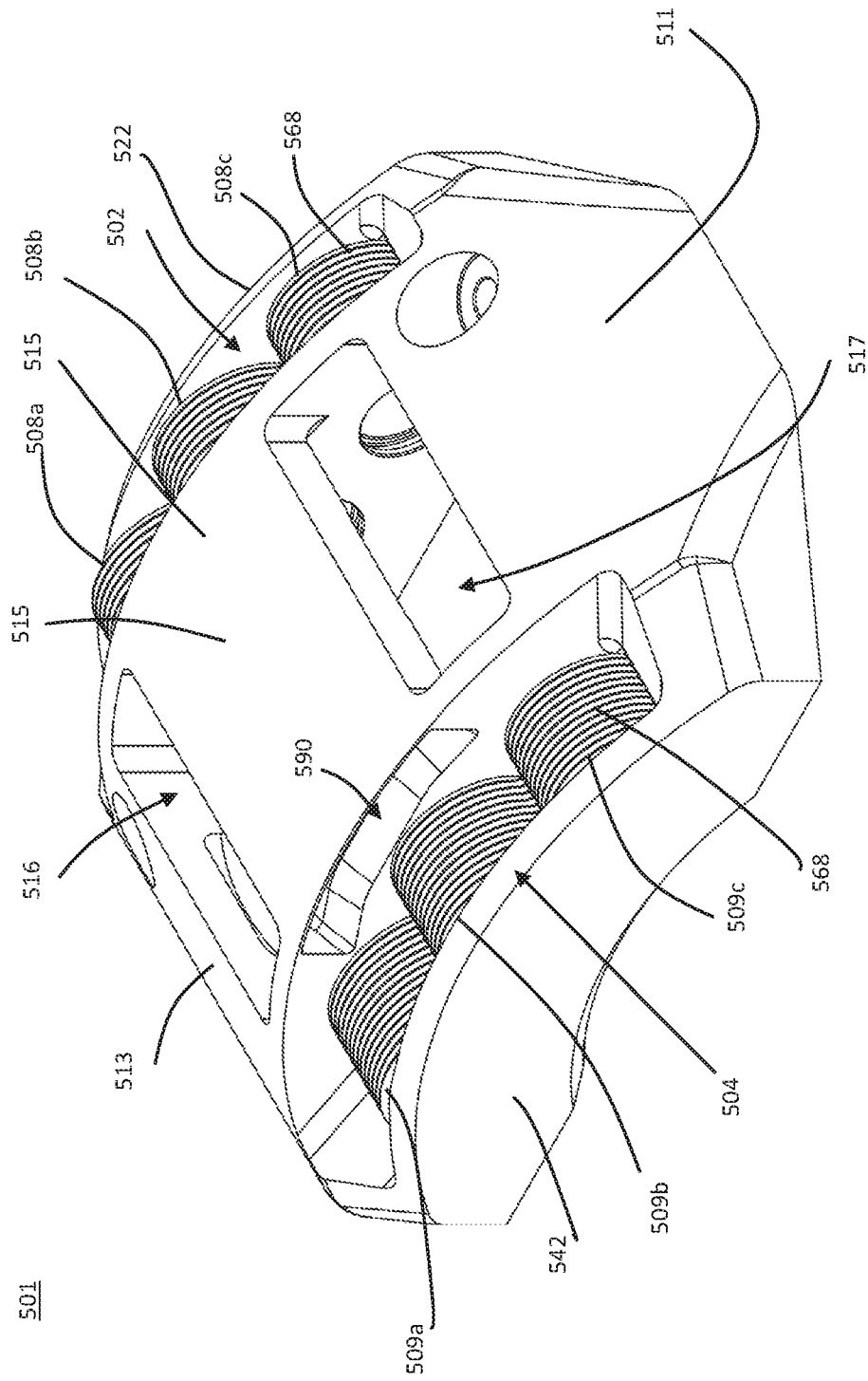
FIG. 6a is a perspective view of a sixth embodiment of the caliper body according to the present invention.

A sixth embodiment of the present caliper body is shown in FIGS. 6*a* to 6*c*. Corresponding parts of the first and sixth embodiment are labelled with corresponding reference signs increased by "500". The sixth embodiment of FIGS. 6*a* to 6*c* corresponds mostly to the second to fourth embodiments described hereinbefore. The caliper body 501 of the sixth embodiment comprises similar bridging members 511, 513, 515 to the bridging members of the second and fourth embodiments and a cooling duct 590 extending through the central bridge 515.

In addition, the caliper body 501 comprises a plurality of cooling fins 568 arranged along the outer circumference of the cylinder housings 508*a*, 508*b*, 508*c*, 509*a*, 509*b*, 509*c*. As can be derived from FIG. 6*c*, the cooling vanes 568 are arranged in parallel and extend in a longitudinal direction of the caliper body. FIG. 6*c* further shows that each of the vanes 568 extends across all three cylinder housings 508*a*, 508*b*, 508*c* or 509*a*, 509*b*, 509*c* respectively. The vanes 568 are profiled to follow the shape of the outer circumference of the cylinder housing 508*a*, 508*b*, 508*c*, 509*a*, 509*b*, 509*c*.

Similar to the cooling ducts described hereinbefore, the vanes 568 are produced by additive manufacturing. The vanes 568 can either be formed together with the remaining parts of the caliper body 501 or as a separate "add-on" structure, disposed onto the outer circumference of the cylinder housings 508*a*, 508*b*, 508*c*, 509*a*, 509*b*, 509*c*, after the latter has been produced.

The vanes 568 of the sixth embodiment may principally be added to any of the aforementioned embodiments shown in FIGS. 1*a* to 5*d*.

The invention claimed is:

1. A disc brake caliper body comprising:
   a mounting side bracket and a non-mounting side bracket extending along a circumferential direction of the body, each bracket being configured to hold at least one brake pad, and
   at least one cooling duct including supplementary structures formed by additive manufacturing, the cooling duct being an integral part of the brake caliper body;
   wherein the disc brake caliper body comprises a first end bridge arranged and configured to connect leading ends of the brackets and a second end bridge arranged and configured to connect trailing ends of the brackets;
   wherein the disc brake caliper body comprises a central bridge arranged between the first and second end bridges, the cooling duct extending at least partly through the central bridge; and
   wherein at least parts of the supplementary structures comprise a plurality of vanes, and wherein the vanes extend in an undulating manner along the length of the cooling duct.

2. The disc brake caliper body of claim 1, wherein the cooling duct extends between laterally inner faces of the mounting and non-mounting side brackets.

3. The disc brake caliper body of claim 2, wherein the cooling duct extends between a laterally outer face of the mounting side brackets and cylinder housings of the non-mounting side bracket.

4. The disc brake caliper body of claim 3, wherein the cooling duct comprises a fluid inlet arranged at the laterally outer face of the mounting side bracket at a radially outer end of the caliper body, and wherein the cooling duct comprises a fluid outlet located at a radially inner end of the caliper body.

5. A disc brake caliper body comprising:
   a mounting side bracket and a non-mounting side bracket extending along a circumferential direction of the body, each bracket being configured to hold at least one brake pad, a first end bridge arranged and configured to connect leading ends of the brackets, a second end bridge arranged and configured to connect trailing ends of the brackets and a central bridge arranged between the first and second end bridges,
   at least one cooling duct formed by additive manufacturing, the cooling duct being an integral part of the brake caliper body, the cooling duct extending at least partly through the central bridge
   wherein the cooling duct defines a cavity for conveying cooling fluid, the cavity comprising supplementary structures extending from an inner surface of the cooling duct, and wherein the structures are formed by additive manufacturing; and
   wherein at least parts of the supplementary structures comprise a plurality of vanes, and wherein the vanes extend in an undulating manner along the length of the cooling duct.

6. The disc brake caliper body of claim 5, wherein at least parts of the supplementary structures comprise a lattice structure having a partial skin, and wherein the lattice structure has a bulk density of 10% to 50%, more preferably 10% to 30%.

7. The disc brake caliper body of claim 6, wherein at least parts of the supplementary structures comprise a lattice structure having a partial skin, and wherein the lattice structure has a bulk density of 10% to 30%.

8. The disc brake caliper body of claim 7, wherein the cooling duct comprises a varying cross-sectional area along its length.

9. The disc brake caliper body of claim 5, wherein the cooling duct comprises a varying cross-sectional area along its length.

10. A disc brake caliper body comprising:
    a mounting side bracket and a non-mounting side bracket extending along a circumferential direction of the body, each bracket being configured to hold at least one brake pad, and
    at least one cooling duct including supplementary structures formed by additive manufacturing, the cooling duct being an integral part of the brake caliper body;
    wherein the disc brake caliper body comprises a first end bridge arranged and configured to connect leading ends of the brackets and a second end bridge arranged and configured to connect trailing ends of the brackets;
    wherein the disc brake caliper body comprises a central bridge arranged between the first and second end bridges, the cooling duct extending at least partly through the central bridge; and
    wherein at least parts of the supplementary structures comprise a plurality of column-shaped reinforcement members extending in a substantially radial direction of the caliper body.

11. The disc brake caliper body of claim 10, wherein the cooling duct extends between laterally inner faces of the mounting and non-mounting side brackets.

12. The disc brake caliper body of claim 11, wherein the cooling duct extends between a laterally outer face of the mounting side brackets and cylinder housings of the non-mounting side bracket.

13. The disc brake caliper body of claim 12, wherein the cooling duct comprises a fluid inlet arranged at the laterally outer face of the mounting side bracket at a radially outer end of the caliper body, and wherein the cooling duct comprises a fluid outlet located at a radially inner end of the caliper body.

14. A disc brake caliper body comprising:
 a mounting side bracket and a non-mounting side bracket extending along a circumferential direction of the body, each bracket being configured to hold at least one brake pad, a first end bridge arranged and configured to connect leading ends of the brackets, a second end bridge arranged and configured to connect trailing ends of the brackets and a central bridge arranged between the first and second end bridges,
 at least one cooling duct formed by additive manufacturing, the cooling duct being an integral part of the brake caliper body, the cooling duct extending at least partly through the central bridge
 wherein the cooling duct defines a cavity for conveying cooling fluid, the cavity comprising supplementary structures extending from an inner surface of the cooling duct, and wherein the structures are formed by additive manufacturing; and
 wherein at least parts of the supplementary structures comprise a plurality of column shaped reinforcement members extending in a substantially radial direction of the caliper body.

15. The disc brake caliper body of claim 14, wherein at least parts of the supplementary structures comprise a lattice structure having a partial skin, and wherein the lattice structure has a bulk density of 10% to 30%.

* * * * *